US012049360B2

(12) United States Patent
Heggebø et al.

(10) Patent No.: US 12,049,360 B2
(45) Date of Patent: *Jul. 30, 2024

(54) AUTOMATED STORAGE AND RETRIEVAL SYSTEM, A METHOD OF OPERATING THE SYSTEM AND A MULTI TROLLEY VEHICLE

(71) Applicant: Autostore Technology AS, Nedre Vats (NO)

(72) Inventors: Jørgen Djuve Heggebø, Olen (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,160

(22) Filed: Jun. 2, 2022

(65) Prior Publication Data

US 2022/0289482 A1    Sep. 15, 2022

Related U.S. Application Data

(63) Continuation of application No. 16/760,805, filed as application No. PCT/EP2018/078145 on Oct. 16, 2018, now Pat. No. 11,390,461.

(30) Foreign Application Priority Data

Nov. 2, 2017  (NO) .................................. 20171741

(51) Int. Cl.
*B65G 1/04* (2006.01)
*B65G 1/06* (2006.01)
(Continued)

(52) U.S. Cl.
CPC ........... *B65G 1/065* (2013.01); *B65G 1/0464* (2013.01); *B65G 1/0478* (2013.01); *B65G 1/1375* (2013.01); *G05B 19/41895* (2013.01)

(58) Field of Classification Search
CPC .... B65G 1/065; B65G 1/0464; B65G 1/1375; B65G 1/0478; B65G 1/04; G05B 19/41895
See application file for complete search history.

(56) References Cited

U.S. PATENT DOCUMENTS 9,550,624 B2 *  1/2017  Khodl .................. B65G 1/1378
9,682,822 B2    6/2017  Lindbo et al.
(Continued)

FOREIGN PATENT DOCUMENTS

CN    101711210       5/2010
CN    101711210 A     5/2010
(Continued)

OTHER PUBLICATIONS

International Search Report issued in PCT/EP2018/078145 dated Jan. 22, 2019 (6 pages).
(Continued)

*Primary Examiner* — Thomas Randazzo
(74) *Attorney, Agent, or Firm* — Baker Botts L.L.P.

(57) ABSTRACT

An automated storage and retrieval system that includes a rail system that includes a first set of parallel tracks, arranged in a horizontal plane and extending in a first direction, and a second set of parallel tracks, arranged in the horizontal plane and extending in a second direction that is orthogonal to the first direction; a plurality of stacks of storage containers arranged in storage columns located beneath the rail system, each storage column is located vertically below a grid opening; and a trolley for transporting the storage containers between the storage columns and at least one deployment area. The first and second sets of tracks form a grid pattern in the horizontal plane including a plurality of adjacent grid cells, each grid cell including a grid opening defined by a pair of neighboring tracks of the first set of tracks and a pair of neighboring tracks of the (Continued)

second set of track. The trolley is movable on any rail including: on the rail system or in a horizontal plane above or below the rail system, on dedicated transport rails between the rail system and the deployment area, on a double rail above or below the rail system or combinations thereof. The deployment area provides direct access to an area outside the grid pattern formed by the first and second sets of tracks. The trolley provides a container volume for storing at least one of the storage containers. The trolley includes moving devices allowing movement of the trolley in at least one of the first direction and the second direction.

20 Claims, 14 Drawing Sheets

(51) Int. Cl.
 *B65G 1/137* (2006.01)
 *G05B 19/418* (2006.01)

(56) References Cited

U.S. PATENT DOCUMENTS

| | | | |
|---|---|---|---|
| 11,390,461 B2 * | 7/2022 | Heggebø | B65G 1/065 |
| 2008/0213073 A1 | 9/2008 | Benedict et al. | |
| 2016/0129587 A1 * | 5/2016 | Lindbo | B65D 21/0209 |
| | | | 700/218 |
| 2018/0155059 A1 * | 6/2018 | Thogersen | B65G 1/1375 |

FOREIGN PATENT DOCUMENTS

| | | |
|---|---|---|
| CN | 101711210 B | 6/2014 |
| CN | 104837747 | 8/2015 |
| CN | 104837747 A | 8/2015 |
| CN | 105899398 | 8/2016 |
| CN | 105899398 A | 8/2016 |
| CN | 106575391 | 4/2017 |
| CN | 106575391 A | 4/2017 |
| DE | 102009017241 | 10/2010 |
| DE | 102009017241 B4 | 12/2016 |
| EP | 3050824 | 8/2016 |
| EP | 3050824 A1 | 8/2016 |
| GB | 2544650 | 5/2017 |
| GB | 2544650 A | 5/2017 |
| JP | H10-105238 | 4/1998 |
| JP | H10-105238 A | 4/1998 |
| JP | 2016529181 A | 9/2016 |
| JP | 2016196372 A | 11/2016 |
| JP | 2017509564 A | 4/2017 |
| JP | 2017524625 A | 8/2017 |
| NO | 317366 | 10/2004 |
| NO | 317366 B1 | 10/2004 |
| WO | 2013/167907 | 11/2013 |
| WO | 2013/167907 A1 | 11/2013 |
| WO | 2014075937 A1 | 5/2014 |
| WO | WO2014075937 | 5/2014 |
| WO | 2014090684 | 6/2014 |
| WO | 2014090684 A1 | 6/2014 |
| WO | 2014/116947 | 7/2014 |
| WO | 2014/116947 A1 | 7/2014 |
| WO | 2014/195901 A1 | 12/2014 |
| WO | 2015193278 A1 | 12/2015 |
| WO | WO2015193278 | 12/2015 |
| WO | 2016198467 | 12/2016 |
| WO | 2016198467 A1 | 12/2016 |
| WO | 2017037095 | 3/2017 |
| WO | 2017037095 A1 | 3/2017 |
| WO | 2017081281 | 5/2017 |
| WO | 2017081281 A1 | 5/2017 |
| WO | 2017/121512 | 7/2017 |
| WO | 2017/121512 A1 | 7/2017 |
| WO | 2018162757 A1 | 9/2018 |

OTHER PUBLICATIONS

Written Opinion of the International Searching Authority issued in PCT/EP2018/078145 dated Jan. 22, 2019 (10 pages).
Office Action issued in the counterpart Chinese Patent Application No. 201880076420.4, dated Mar. 3, 2021 (14 pages).
Office Action issued in Eurpoean Application No. 18788748.4; Dated Mar. 14, 2023 (5 pages).
Office Action issued in counterpart Japanese Patent Application No. 2022-186384 mailed on Feb. 9, 2024 (6 pages).

* cited by examiner

AUTOMATED STORAGE AND RETRIEVAL SYSTEM, A METHOD OF OPERATING THE SYSTEM AND A MULTI TROLLEY VEHICLE

The present invention relates to an automated storage and retrieval system, a multi trolley vehicle for moving storage containers stacked in stacks within the system and a method of operating such an automated storage and retrieval system.

BACKGROUND AND PRIOR ART

FIG. 1 discloses a framework structure 1 of a typical prior art automated storage and retrieval system and FIGS. 2A-2C disclose different container handling vehicles 9 of such a system.

The framework structure 1 comprises a plurality of upright members 2 and a plurality of horizontal members 3, which are supported by the upright members 2. The members 2, 3 may typically be made of metal, e.g. extruded aluminium profiles.

The framework structure 1 defines a storage grid 4 comprising storage columns 5 arranged in rows, in which storage columns 5 store storage containers 6, also known as bins, are stacked one on top of another to form stacks 7. Each storage container 6 may typically hold a plurality of product items (not shown), and the product items within a storage container 6 may be identical, or may be of different product types depending on the application. The framework structure 1 guards against horizontal movement of the stacks 7 of storage containers 6, and guides vertical movement of the containers 6, but does normally not otherwise support the storage containers 6 when stacked.

A rail system 8 is arranged in a grid pattern across the top of the storage columns 5, on which rail system 8 a plurality of container handling vehicles 9 are operated to raise storage containers 6 from and lower storage containers 6 into the storage columns 5, and also to transport the storage containers 6 above the storage columns 5. The rail system 8 comprises a first set of parallel rails 10 arranged to guide movement of the container handling vehicles 9 in a first direction X across the top of the frame structure 1, and a second set of parallel rails 11 arranged perpendicular to the first set of rails 10 to guide movement of the container handling vehicles 9 in a second direction Y, which is perpendicular to the first direction X. In this way, the rail system 8 defines grid columns 12 above which the container handling vehicles 9 can move laterally above the storage columns 5, i.e. in a plane which is parallel to the horizontal X-Y plane.

Each container handling vehicle 9 comprises a vehicle body 13 and first and second sets of wheels 14, 15 which enable the lateral movement of the container handling vehicle 9, i.e. the movement in the X and Y directions. In FIG. 2A two wheels in each of the sets 14, 15 are visible, while in FIGS. 2B and 2C only two wheels in one of the set of wheels 14 are visible. The first set of wheels 14 is arranged to engage with two adjacent rails of the first set 10 of rails, and the second set of wheels 15 arranged to engage with two adjacent rails of the second set 11 of rails. Each set of wheels 14, 15 can be lifted and lowered, so that the first set of wheels 14 and/or the second set of wheels 15 can be engaged with the respective set of rails 10, 11 at any one time.

Each container handling vehicle 9 also comprises a lifting device 16 (see FIGS. 2B and 2C) for vertical transportation of storage containers 6, e.g. raising a storage container 6 from and lowering a storage container 6 into a storage column 5. The lifting device may be arranged inside the body 13 (as in FIG. 2A) or outside the body 13 (as disclosed in FIGS. 2B and 2C). The lifting device 16 may comprise a lifting frame 18 which is adapted to engage a storage container 6, which lifting frame 18 can be lowered from the vehicle body 13 so that the position of the lifting frame with respect to the vehicle body 13 can be adjusted in a third direction Z, which is orthogonal the first direction X and the second direction Y.

Conventionally, and also for the purpose of this application, Z=1 identifies the uppermost layer of the grid 4, i.e. the layer immediately below the rail system 8, Z=2 the second layer below the rail system 8, Z=3 the third layer etc. In the embodiment disclosed in FIG. 1, Z=8 identifies the lowermost, bottom layer of the grid 4. Consequently, as an example and using the Cartesian coordinate system X, Y, Z indicated in FIG. 1, the storage container identified as 7' in FIG. 1 can be said to occupy grid location or cell X=10, Y=2, Z=3. The container handling vehicles 9 can be said to travel in layer Z=0 and each grid column can be identified by its X and Y coordinates.

Each container handling vehicle 9 comprises a storage compartment or space for receiving and stowing a storage container 6 when transporting the storage container 6 across the grid 4. The storage space may comprise a cavity arranged centrally within the vehicle body 13 (FIG. 2A), e.g. as is described in WO2014/090684A1, the contents of which are incorporated herein by reference. Alternatively, the storage compartment or space can be arranged on the side of the body as disclosed in FIGS. 2B and 2C, i.e. the container handling vehicles may have a cantilever construction, as is described in NO317366, the contents of which are also incorporated herein by reference.

The container handling vehicles 9 may have a footprint 22 (see FIG. 4), i.e. an extension in the X and Y directions, which is generally equal to the lateral or horizontal extension of a grid column 12, i.e. the extension of a grid column 12 in the X and Y directions, e.g. as is described in WO2015/193278A1, the contents of which are incorporated herein by reference. Alternatively, the container handling vehicles 9 may have a footprint which is larger than the lateral extension of a grid column 12, e.g. as is disclosed in WO2014/090684A1.

The rail system 8 may be a single rail system, as is shown in FIG. 3. Alternatively, the rail system 8 may be a double rail system, as is shown in FIG. 4, thus allowing a container handling vehicle 9 having a footprint 22 generally corresponding to the lateral extension of a grid column 12 to travel along a row of grid columns even if another container handling vehicle 9 is positioned above a grid column neighbouring that row.

In a storage grid, a majority of the grid columns 12 are storage columns 5, i.e. grid columns where storage containers are stored in stacks. However, a grid normally has at least one grid column which is used not for storing storage containers, but which comprises a location where the container handling vehicles can drop off and/or pick up storage containers so that they can be transported to an access station where the storage containers can be accessed from outside of the grid or transferred out of or into the grid. Within the art, such a location is normally referred to as a "port" and the grid column in which the port is located may be referred to as a port column.

The grid 4 in FIG. 1 comprises two port columns 19 and 20. The first port column 19 may for example be a dedicated drop-off port column where the container handling vehicles 9 can drop off storage containers to be transported to an access or a transfer station (not shown), and the second port 20 column may be a dedicated pick-up port column where the container handling vehicles 9 can pick up storage containers that have been transported to the grid 4 from an access or a transfer station.

The access station may typically be a picking or a stocking station where product items are removed from or positioned into the storage containers. In a picking or a stocking station, the storage containers are normally never removed from the automated storage and retrieval system, but are returned back into the grid once accessed. A port can also be used for transferring storage containers out of or into the grid, e.g. for transferring storage containers to another storage facility (e.g. to another grid or to another automated storage and retrieval system), to a transport vehicle (e.g. a train or a lorry), or to a production facility.

A conveyor system comprising conveyors is normally employed to transport the storage containers between the ports and the access station.

If the port and the access station are located at different levels, the conveyor system may comprise a lift device for transporting the storage containers vertically between the port and the access station.

The conveyor system may be arranged to transfer storage containers between different grids, e.g. as is described in WO2014/075937A1, the contents of which are incorporated herein by reference.

WO2016/198467A1, the contents of which are incorporated herein by reference, disclose an example of a prior art access system having conveyor belts (FIGS. 5a and 5b in WO2016/198467A1) and a frame mounted track (FIGS. 6a and 6b in WO2016/198467A1) for transporting storage containers between ports and work stations where operators can access the storage containers.

When a storage container 6 stored in the grid 4 disclosed in FIG. 1 is to be accessed, one of the container handling vehicles 9 is instructed to retrieve the target storage container from its position in the grid 4 and transport it to the drop-off port 19. This operation involves moving the container handling vehicle 9 to a grid location above the storage column in which the target storage container is positioned, retrieving the storage container from the storage column using the container handling vehicle's lifting device (not shown), and transporting the storage container to the drop-off port 19. If the target storage container 6 is located deep within a stack 7, i.e. with one or a plurality of other storage containers positioned above the target storage container, the operation also involves temporarily moving the above-positioned storage containers prior to lifting the target storage container from the storage column. This step, which is sometimes referred to as "digging" within the art, may be performed with the same container handling vehicle 9 that is subsequently used for transporting the target storage container to the drop-off port 19, or with one or a plurality of other cooperating container handling vehicles 9. Alternatively, or in addition, the automated storage and retrieval system may have container handling vehicles 9 specifically dedicated to the task of temporarily removing storage containers 6 from a storage column. Once the target storage container has been removed from the storage column, the temporarily removed storage containers 6 can be repositioned into the original storage column. However, the removed storage containers 6 may alternatively be relocated to other storage columns.

When a storage container 6 is to be stored in the grid 4, one of the container handling vehicles 9 is instructed to pick up the storage container from the pick-up port 20 and transport it to a grid location above the storage column where it is to be stored. After any storage containers 6 positioned at or above the target position within the storage column stack have been removed, the container handling vehicle 9 positions the storage container 6 at the desired position. The removed storage containers may then be lowered back into the storage column, or relocated to other storage columns.

For monitoring and controlling the automated storage and retrieval system, e.g. monitoring and controlling the location of respective storage containers within the grid 4, the content of each storage container 6, and the movement of the container handling vehicles 9 so that a desired storage container can be delivered to the desired location at the desired time without the container handling vehicles 9 colliding with each other, the automated storage and retrieval system comprises a control system, which typically is computerised and comprises a database for keeping track of the storage containers.

With known automated storage and retrieval systems, the area surrounding the ports may become congested with container handling vehicles instructed to drop off or pick up storage containers. This may seriously impede the operation of the automated storage and retrieval system. In small systems this situation may possibly be alleviated by adding ports to the grid, as this will allow the container handling vehicles to be distributed among a larger number of ports in order to avoid congestion. However, if ports are added, the conveyor system infrastructure must normally be increased. This requires space, which may not necessarily be available. Also, adding conveyor system infrastructure is costly.

Furthermore, the current trend within the automated storage and retrieval system industry is that there is an increasing demand for larger storage grids. Since the number of storage containers stored in a grid generally scales as the volume of the grid, but the space available for ports generally scales as the surface of the grid, increasing the number of ports will not satisfactory alleviate the congestion problem when the grid size increases.

In view of the above, one or more embodiments of the invention may provide an automated storage and retrieval system, and a method for operating such a system, that reduce congestion of container handling vehicles at the ports.

One or more embodiments of the invention may increase the capacity in terms of moving more storage containers in less time than in the prior art.

SUMMARY OF THE INVENTION

The invention is set forth in the independent claims and the dependent claims describe alternatives of the invention.

The invention relates to an automated storage and retrieval system comprising:
  a rail system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks; and a plurality of stacks of storage containers arranged in storage columns located beneath the rail system, wherein each storage column is located vertically below a grid opening;

wherein the system further comprises:

a multi trolley vehicle for transporting storage containers between the storage columns and at least one deployment area, which deployment area provides direct access to an area outside the grid pattern, the multi trolley vehicle comprising:

a trolley assembly comprising a plurality of trolleys coupled to each other along at least one of the first direction and second direction, where each trolley provides at least one container volume for storing at least one of the storage containers, and where each trolley comprises moving devices allowing movement of the trolley assembly in at least one of the first direction and/or the second direction, and where at least one of the trolleys comprises non-motorized moving devices, and a first drive vehicle coupled to the trolley assembly, the first drive vehicle comprising motorized moving devices allowing self-propelled movement of the first drive vehicle and thereby the multi trolley vehicle in at least one of the first and second directions corresponding to the at least one of the first and second directions of the trolley assembly, such that the multi trolley vehicle is horizontally movable.

Thus, according to the invention, a drive vehicle connected to a trolley assembly, the setup which is also referred to as multi trolley vehicle, is capable of transporting one or a group of storage containers between the storage columns and the at least one deployment area, which deployment area provides direct access to an area outside the grid pattern. Furthermore, the rail system is preferably only the top layer of the automated storage and retrieval system, the storage columns are defined volumes below the rail system.

The system is provided with at least one drive vehicle, i.e. the first drive vehicle, on one end of the trolley assembly or partway or midway within the trolley assembly, thereby defining a multi trolley vehicle. The at least one drive vehicle can thus be seen as locomotive, towing vehicle, hauling vehicle, traction engine, tractive machine, tractive unit, tractor, i.e. any vehicle capable of being connected to the trolley assembly. Various terms are used in the following description of the system defined by at least one drive vehicle connected to a trolley assembly, including multi trolley vehicle. If the system comprises more than one drive vehicle, e.g. also a second drive vehicle, the combination of drive vehicles and trolley assembly is still referred to as a multi trolley vehicle. The drive vehicle(s) may either push or pull the trolley assembly, and can be arranged in front of, and or behind, and or partway within, said trolley assembly. Alternatively, the drive vehicle(s) may also pull or drag the trolley assembly sideways. In this latter aspect, the drive vehicles and the trolleys are preferably configured with moving devices directed in both the X direction and Y direction. The deployment area can in one aspect be a port, in another aspect be a factory area, in yet another aspect be a production facility, in yet another aspect another rail or grid system with or without a dedicated storage system. In one aspect, if the deployment area is a port or port area which has access from outside the grid pattern (rail system), the port or port area can be arranged within or outside of the grid pattern, either extending along an end row or extending into or out from the grid pattern. Furthermore, the at least one drive vehicle and trolley assembly can move on the rail system or in a plane horizontally above or below the rail system (for example on a double rail). If driving in a plane horizontally below the rail system, the at least one drive vehicle and trolley assembly can function as a conveyor belt for the storage containers. In another aspect, if the deployment area is a factory area, a production facility or another grid or rail system, direct access to an any of the latter areas which are outside the grid pattern is achieved. The multi trolley vehicle can move on the rail system, dedicated transport rails between the rail system and deployment area, on a double rail above or below the rail system or combinations thereof. The multi trolley vehicle can further transport storage containers from the deployment area to a storage position, i.e. a column in the grid. Thus, in an aspect where the deployment area is far away from the grid or rail system, the multi trolley vehicle provides for fast transfer of storage containers between the rail system and deployment area, and the deployment area and the grid or rail system.

If the deployment area is a factory area, it can be a service area where service may be conducted on the trolleys and or any of the drive vehicles manually or by machines.

The number of trolleys in one trolley assembly can easily be varied, and can be adapted based on the number of columns in the deployment area and or in a transfer zone, i.e. any number of trolley(s) can be added or subtracted from the trolley assembly thereby changing the number of trolleys making up the trolley assembly. One trolley can provide for lifting of more than one storage container and the trolley may occupy more than one row in the width and or length direction of the multi trolley vehicle. In the latter case, one trolley may be configured with more than one lifting devices, for example the number of lifting devices in one trolley corresponds to the number of cells occupied by the one trolley. Furthermore, the area occupied by one trolley may be smaller than, or substantially equal to, the size of a single cell. However, the occupied area of one trolley may also be larger than a single cell.

In an aspect, the automated storage and retrieval system further comprises a plurality of container handling vehicles which are operated on the rail system for retrieving storage containers from and storing storage containers in the storage columns, and for transporting the storage containers horizontally across the rail system. Furthermore, the rail system may comprise at least one transfer zone with underlying transfer columns for temporarily storing storage containers when in transit between the plurality of storage columns and the at least one deployment area, wherein the container handling vehicles are arranged to transport the storage containers between the storage columns and the at least one transfer zone.

Thus, the container handling vehicles are utilised to transport the storage containers between the storage columns and the transfer columns in the transfer zone.

The transfer zone is defined as a 2D area (in the Z and Y directions) on top of the rail system, i.e. the tracks, and the storage containers can be stored below the rail system or on top of the rail system from Z=0 to Z=X, where X is number of the lowermost storage position in the grid.

As compared to providing more ports to alleviate congestion, it is easy to increase the number of transfer columns in the transfer zone in the rail system. Furthermore, the transfer columns in the transfer zone(s) can be located inside the rail system, e.g. at a distance within the circumference of the rail system, thus allowing the container handling vehicles access to the transfer columns from the X and Y directions. A port, on the other hand, is normally located at the circumference of the rail system and, therefore, is normally only accessible from one direction. The transfer columns are preferably standard columns, and the location of the transfer zones with transfer columns in the rail system can be computer operated, thereby the position of the transfer zone and thereby the transfer columns can be programmed to be at the most convenient location, and can be continuously changed. The transfer columns can be a row of 1, 2, 3, 4, 5, 6, . . . , 10, . . . , 15 single cells in the rail system or more. A single cell is the area defined by two pairs of opposing bars in the X and Y directions.

One transfer zone comprises a plurality of neighboring individual transfer columns. The transfer columns can further be along more than one row, e.g. 2, 3 or more parallel rows, either neighboring rows or not. The transfer zones, i.e. the transfer columns, can thus preferably be moved in the same direction as the direction of travel of the multi trolley vehicle(s). The location of the transfer zone(s), i.e. the transfer columns, is thus preferably always temporarily. This renders possible freeing up area on the rail system dependent on the operation of the container handling vehicles and or other vehicles moving on the rail system. For example, if a target bin is below, i.e. for example at Z=8, and a temporarily transfer column is at Z=6, the transfer zone, and thereby the transfer column, can easily be relocated such that a container handling device can access the container at Z=8.

Furthermore, this temporarily location of the transfer zones, allows for flexibility and provides maximum storage capacity in the grid system.

It may be advantageous if the transfer columns form a transfer zone and the at least one port form a port zone, wherein the transfer zone is adjacent the port zone. Alternatively, the transfer zone may be arranged at a distance from the port zone.

In an aspect, all moving devices in each trolley are non-motorized. In this aspect, the at least one drive vehicle is a master vehicle and all of the trolleys in the trolley assembly are slave vehicles.

In another aspect, one or more of the trolleys comprises motorized moving devices. To provide the trolleys with motorized moving devices can be advantageous in situations where a plurality of trolleys are used because the drag/push capacity of the drive vehicle(s) can be limited, i.e. insufficient to drag/push a plurality of trolleys.

In an aspect, the moving devices comprise wheels.

In another aspect, the moving devices comprise belts.

According to an aspect, the multi trolley vehicle is arranged to transport the storage containers between the at least one transfer zone and the at least one deployment area on the rail system, or in a plane located above or below the rail system. The transporting of the containers can be along at least a double rail, e.g. two parallel rails. By transporting the storage containers between the transfer columns in the transfer zone and the deployment area in a plane, for example on a double rail, which is located above or below the container handling vehicles, i.e. above or below the plane where the container handling vehicles travel across the rail system, any interference on the transfer of the storage containers between the transfer columns and the deployment area may have on the movement of the container handling vehicles will be minimized. The double rail may be suspended from the ceiling, be fastened to the walls, be supported on dedicated support legs, be mounted on the grid structure etc.

Each drive vehicle can occupy a single cell or more than one cell. Similarly, each trolley can occupy a single cell or more than one cell. Thus, the multi trolley vehicle may occupy one row, or may extend over more than one row, e.g. 1, 2, 3, 4, 5 . . . 10 rows to increase the transport capacity.

This means that according to one aspect of the invention the size of the at least one trolley may occupy a single cell or, alternatively in another aspect of the invention, one trolley may occupy more than one cell both in the direction of travel and/or in the direction perpendicular to the direction of travel (i.e. in the X and or Y directions on the rail system). According to this latter aspect, each trolley can be provided with a plurality of lifting devices, e.g. elevators, for lifting and lowering storage containers between a column in the grid and a compartment for the storage containers in the trolley, which number of elevators corresponds to the number of cells occupied by the trolley. Furthermore, the drive vehicle(s) can occupy less rows than the connected trolleys, e.g. the drive vehicle(s) can occupy one row, whereas the trolley or trolley assembly can extend over 2 or more rows.

In an aspect, the system may comprise a second drive vehicle with motorized driving devices allowing self-propelled movement of the second drive vehicle in at least one of the first direction and/or the second direction, which second drive vehicle is connectable to a second end of the trolley assembly.

In an aspect, the first drive vehicle is arranged to transport the trolley assembly in a first direction, and the second drive vehicle is arranged to transport the trolley assembly in a second direction, which second direction is opposite the first direction.

In an aspect, the motorized moving devices of the first drive vehicle connected to the first end of the trolley assembly are configured to allow self-propelled, one-way movement along at least one of the first direction and/or the second direction and the motorized moving devices of the second drive vehicle connected to the second end of the trolley assembly are configured to allow self-propelled, one-way movement along an opposite direction of the at least one first direction and the second direction.

The connections between each trolley in the trolley assembly and any of the first drive vehicle and second drive vehicle may in an aspect allow a certain degree of movement between two adjacent trolleys and or the first or second drive vehicle in at least one direction, i.e. the connection is configured to allow movements along the direction of coupling corresponding to at least 1% of the length of the respective coupling, thereby allowing the multi-trolley vehicle to follow curves in a track or go up a slope. Such connection may be mechanical connections, such as a pivot connection allowing some vertical and horizontal movement between adjacent trolleys or drive vehicles, a hook system, magnetic connection etc. A mechanical connection may e.g. be a single bracket, or two brackets connectable to each other, wherein the bracket(s) are fixed with fastening elements to adjacent trolleys or drive vehicles and provide some flexibility in the vertical direction, i.e. in the Z direction (if the driving direction is in the X or Y direction). As such, possible challenges related to irregularities on the rail system surface, such as particles, is greatly reduced.

The fastening elements may be screws or bolts or any other suitable fastening elements, or combinations thereof. In order to provide flexibility in the capacity and size of the multi trolley vehicle, the connection between the trolleys and any drive vehicles can be disconnectable, allowing easy addition of or, removal of, trolleys from the multi trolley vehicle.

In an aspect, a drive system in the at least first drive vehicle comprises a hub motor arranged within each of the moving devices. Alternatively, the drive system in the at least first, second or any additional drive vehicle may comprise an electric drive system, a direct drive system, a master wheel driving the driving elements as described in WO 2015/193278 hereby incorporated by reference, a motor rotor driven by a stator, an electric system etc. An example of such motor rotor driven by an internal stator is shown in EP 3 050 824 A1, which document is incorporated herein by reference. If using wheels or belts as the moving devices, the complete motor can be arranged inside the external boundaries defined by the wheel (e.g. wheel rim etc.).

Furthermore, if one or more of the trolleys in the trolley assembly comprises motorized moving devices, the drive system for the motorized moving devices may comprise similar solutions as described above in relation to the at least first, second or any additional drive vehicle.

In an aspect, each trolley may comprise an open bottom end and a closed top end, and wherein a lifting device, such as an elevator, can be connected to the top end for lifting and lowering storage containers between a storage column and the compartment in the trolley.

The system may further comprise a port access vehicle, which port access vehicle comprises a plurality of vehicle sections which are connected one after the other in a train-like configuration, which vehicle sections each being configured to carry at least one storage container, and a plurality of container lifting and holding devices enabling simultaneous transport of a plurality of storage containers between the rail system and the deployment area, and wherein the port access vehicle is arranged to transport the storage containers between the rail system and the at least one deployment area in a plane located above the rail system. The train-like configuration allows for the port access vehicle to be easily adapted to changing conditions in the grid or rail system. The port access vehicle may be operated on the rail system, e.g. be arranged to travel along the rail system of the grid. Alternatively, the port access vehicle may be operated on a monorail or double rail arranged in a parallel horizontal plane above the rail system.

In an aspect, each trolley may comprise a closed bottom end and an open top end for receiving storage containers from above. This is rendered possible by for example allowing the trolley assembly to cooperate with one or more stationary lifting arrangements, using e.g. a port access vehicle, or using another multi trolley vehicle operating in the same X and Y rows but in different Z locations, i.e. arranged directly above the trolleys. It may be advantageous if the port access vehicle comprises a first lifting and transfer device arranged to carry a storage container from one of the transfer columns to the trolleys.

In order to increase the capacity of the port access vehicle, it may be advantageous if the port access vehicle comprises a plurality of container lifting and holding devices enabling simultaneous transport of a plurality of storage containers between the transfer columns in the transfer zone and the at least one port.

The invention further relates to a multi trolley vehicle operable on an automated storage and retrieval system as defined above for moving storage containers between stacks within a grid pattern formed by horizontal first and second set of parallel tracks and a deployment area, which deployment area provides direct access to an area outside the grid pattern formed by first and second sets of parallel tracks, wherein the multi trolley vehicle is configured to move on the rail system above the storage columns and comprises a trolley assembly comprising a plurality of trolleys coupled to each other along at least one of a first direction and second direction, where each trolley provides at least one container volume for storing at least one of the storage containers, and where each trolley comprises moving devices allowing movement of the trolley assembly in at least one of the first direction and/or the second direction, and at least one of the trolleys comprises non-motorized moving devices, and a first drive vehicle coupled to the trolley assembly, the first drive vehicle comprising motorized moving devices allowing self-propelled movement of the first drive vehicle and thereby the multi trolley vehicle in at least one of the first and second directions corresponding to the at least one of the first and second directions of the trolley assembly, such that the multi-trolley vehicle is horizontally movable. Preferably, each trolley comprises a lifting device for lifting a storage container.

It is further described a multi trolley vehicle comprising a trolley assembly comprising a plurality of trolleys coupled to each other along at least one of a first direction and second direction, where each trolley comprise a closed bottom end and an open top end for receiving a storage container from above, and where each trolley displays at least one container volume for storing at least one of the storage containers above the closed bottom end, and where each trolley comprises moving devices allowing movement of the trolley assembly in at least one of the first direction and/or the second direction, and at least one of the trolleys comprises non-motorized moving devices, and a first drive vehicle coupled to the trolley assembly, the first drive vehicle comprising motorized moving devices allowing self-propelled movement of the first drive vehicle and thereby the multi trolley vehicle in at least one of the first and second directions corresponding to the at least one of the first and second directions of the trolley assembly, such that the multi-trolley vehicle is horizontally movable. In this latter multi trolley vehicle each trolley comprises a closed bottom end and an open top end for receiving storage containers from above. This is rendered possible by for example allowing the trolley assembly to cooperate with one or more stationary lifting arrangements, using e.g. a port access vehicle, container handling vehicles or using another multi trolley vehicle operating in the same X and Y rows but in different Z locations, i.e. arranged directly above the trolleys. It may be advantageous if the port access vehicle comprises a first lifting and transfer device arranged to carry a storage container from one of the transfer columns or in port zones lifting or lowering storage containers onto and or off from the trolleys. Thus, it is clear that this multi trolley vehicle can function as a conveyor belt, for example in the port zone, rendering the use of traditional conveyor belts in this area superfluous.

In an aspect, the container volume of the trolley comprises a compartment for fully containing storage containers within a body of the trolley or on the side of the body (cantilever construction).

In an aspect, the multi trolley vehicle further comprises a second drive vehicle with motorized driving devices allowing self-propelled movement of the second drive vehicle in at least one of the first direction and the second direction, which second drive vehicle is connectable to a second end of the trolley assembly.

The invention further relates to method of operating an automated storage and retrieval system, the automated storage and retrieval system comprising: a rail system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks; and a plurality of stacks of storage containers arranged in storage columns located beneath the rail system, wherein each storage column is located vertically below a grid opening; which method comprises:

connecting a trolley assembly comprising a plurality of trolleys to at least a first drive vehicle comprising motorized moving devices to form a multi trolley vehicle, and utilizing said multi trolley vehicle to transport the storage containers between the storage columns and at least one deployment area, which deployment area provides direct access to an area outside the grid pattern formed by the first and second sets of tracks.

In an aspect, the method further comprises:

operating a control system to define at least one transfer zone comprising a plurality of transfer columns for temporarily storing storage containers when in transit between the storage columns and the at least one deployment area;

utilizing container handling vehicles which are operated on the rail system for retrieving storage containers from and storing storage containers in the transfer columns, and for transporting the storage containers horizontally across the rail system; and wherein the step of transporting the storage containers between the transfer columns and the at least one deployment area comprises utilizing a port access vehicle cooperating with the multi trolley vehicle, which port access vehicle comprises a plurality of vehicle sections which are connected one after the other in a train-like configuration in a horizontal plane which is located above the horizontal plane of the rail system where the container handling vehicles and the multi trolley vehicle operate, which vehicle sections each being configured to carry at least one storage container, and wherein the trolleys comprise a closed bottom end are adapted to receive storage containers from above, and wherein the method comprises operating the port access vehicle to lower storage containers on to the trolleys, and subsequently operating the multi-trolley vehicle to transport the storage containers to the deployment area, wherein a second port access vehicle is arranged in the deployment area for lifting the storage containers from the trolleys.

In the following description, numerous specific details are introduced by way of example only to provide a thorough understanding of embodiments of the claimed system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

Following drawings are appended to facilitate the understanding of the invention;

FIG. 16A shows a deployment area being another grid or rail system, FIG. 16B shows the deployment areas being other storage/warehouse systems, and where FIG. 16C shows the deployment area being a factory area or production facility and where the drive vehicle and trolley assembly is configured to move on a double rail formed as a loop between the grid or rail system and the factory area or production facility;

In the drawings, like reference numerals have been used to indicate like parts, elements or features unless otherwise explicitly stated or implicitly understood from the context.

DETAILED DESCRIPTION OF THE INVENTION

Figure 1:
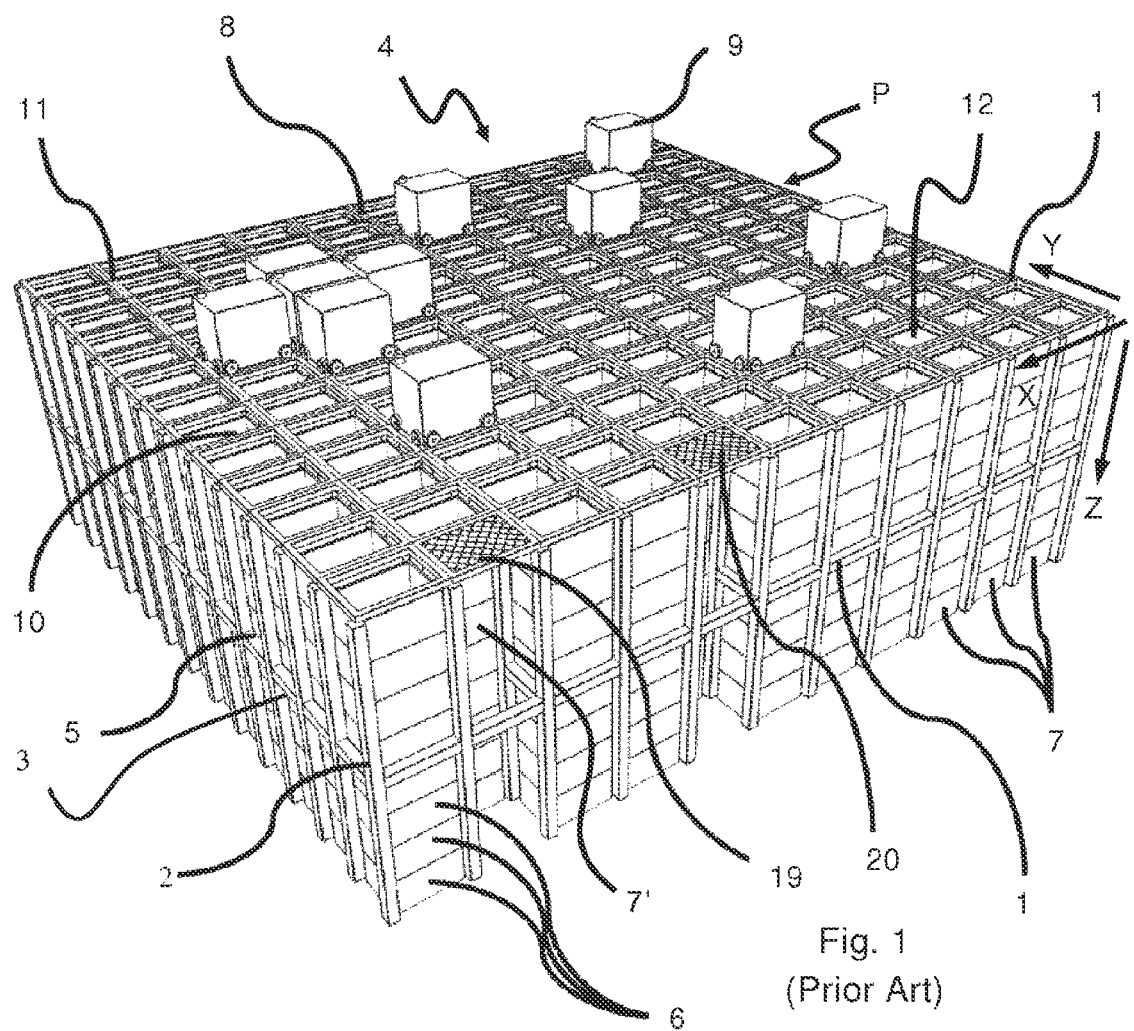
FIG. 1 is a perspective view of a grid with a rail system of a prior art automated storage and retrieval system.
Figure 2A:
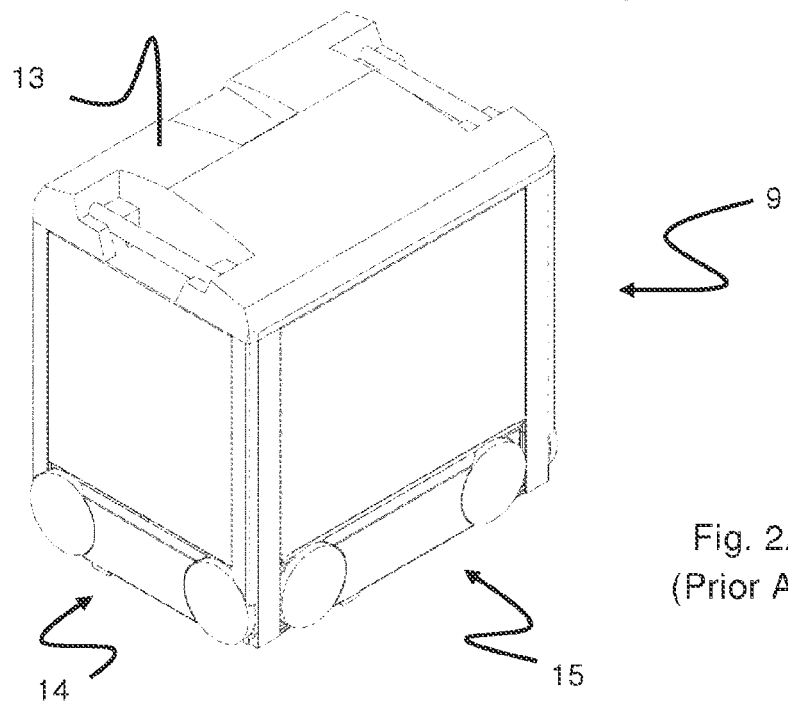
FIG. 2A is a perspective view of a first prior art container handling vehicle.
Figure 2B:
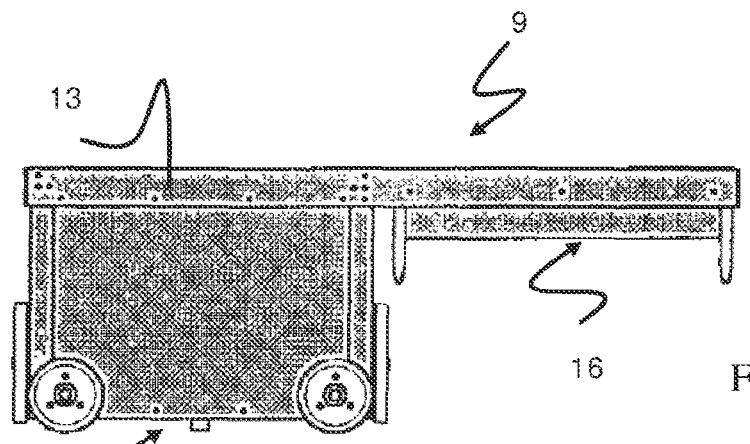
FIG. 2B is a perspective view of a second prior art container handling vehicle.
Figure 2C:
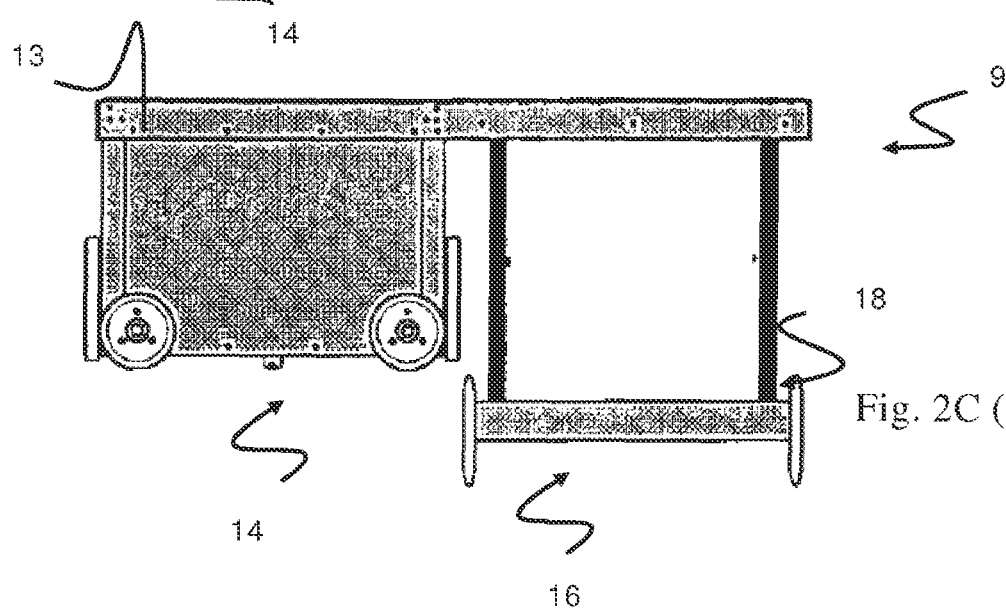
FIG. 2C is a side view of the second prior art container handling vehicle in FIG. 2B, showing a lifting device, i.e. elevator, for lifting and or lowering storage containers.

In the following, embodiments of the invention will be discussed in more detail with reference to the appended drawings. It should be understood, however, that the drawings are not intended to limit the invention to the subject-matter depicted in the drawings.

Furthermore, even if some of the features are described in relation to the system only, it is apparent that they are valid for the method and the multi trolley vehicle as well, and vice versa, i.e. any features described in relation to the method only are also valid for the system and multi trolley vehicle.

Figure 3:
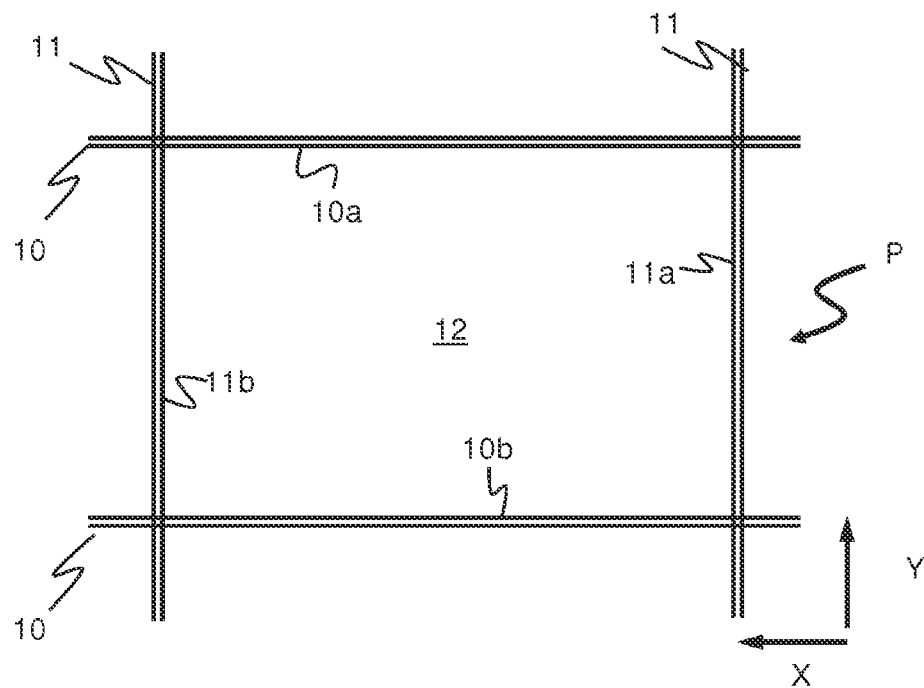
FIG. 3 is a top view of a prior art single rail grid.
Figure 4:
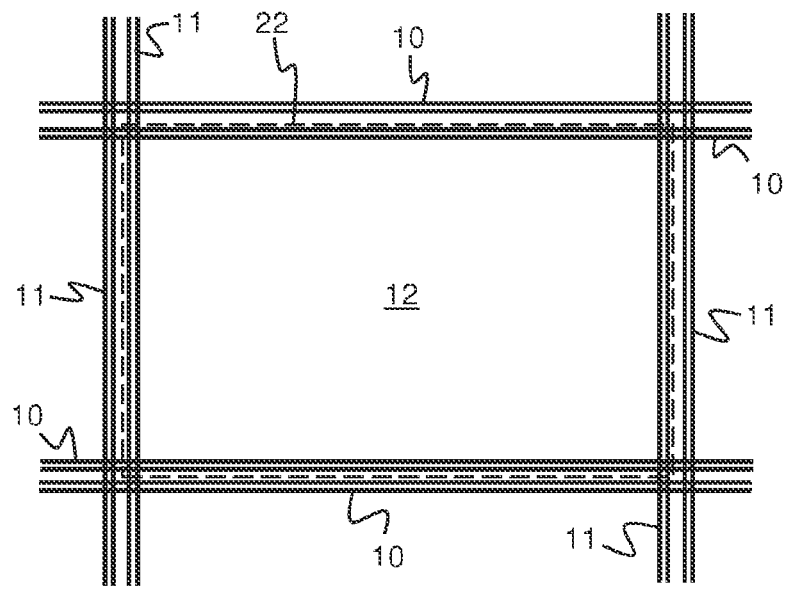
FIG. 4 is a top view of a prior art double rail grid.

FIG. 3 is a top view of a cell of a grid 4 with a rail system 8 of the automated storage and retrieval system. The grid 4 comprises a framework structure 1 comprising a plurality of upright members 2 (see FIG. 1) and a plurality of horizontal members 3 which are supported by the upright members. As is known in the art, the upright and horizontal members may typically be made of metal, e.g. extruded aluminium profiles. The upper surface of the grid 4 has a rail system 8. The rail system 8 comprises a first set of parallel tracks 10 arranged in a horizontal plane P and extending in a first direction X, and a second set of parallel tracks 11 arranged in the horizontal plane P and extending in a second direction Y which is orthogonal to the first direction X. The first and second sets of tracks 10, 11 form a grid pattern in the horizontal plane P comprising a plurality of adjacent grid cells, each comprising a grid opening 12 defined by a pair of neighboring tracks 10a, 10b of the first set of tracks 10 and a pair of neighboring tracks 11a, 11b of the second set of tracks 11. The example grid openings 12 in FIGS. 3 and 4 are part of the overall rail system 8 (see FIG. 1)

A general description of an automated storage and retrieval system according to the invention will now be discussed in more detail with reference to FIG. 11. The horizontal members 3 comprise a rail system 8 arranged in a grid pattern across the top of the storage columns, on which rail system 8 a plurality of container handling vehicles 9 are operated. The rail system 8 comprises a first set of parallel rails 10 arranged to guide movement of the container handling vehicles 9 in a first direction X across the top of the frame structure 1, and a second set of parallel rails 11 arranged perpendicular to the first set 10 to guide movement of the container handling vehicles 9 in a second direction Y that is perpendicular to the first direction X. In this way, the rail system 8 defines grid columns 12 in the horizontal X-Y plane, above which grid columns 12 the container handling vehicles 9 can move horizontally in the X and Y directions. Consequently, the horizontal area of a grid column 12, i.e. along the X and Y directions, may be defined by the distance between adjacent rails 10 and 11, respectively (details in FIG. 4). Consequently, the rail system 8 allows the container handling vehicles 9 to move horizontally in the X-Y plane between different grid locations, where each grid location is associated with a grid column 12.

The container handling vehicles 9 may be of any type known in the art, e.g. any one of the automated container handling vehicles 9 discussed in relation to FIGS. 1 and 2A, 2B, 2C. It may be advantageous if each container handling vehicle 9 comprises a centrally located storage space for receiving and stowing a storage container 6 when transporting the storage container horizontally across the rail system 8, and a footprint, i.e. an extent in the X and Y directions, which is generally equal the horizontal extent of a grid column 12. This will allow a container handling vehicle 9 to transport a storage container above a row of grid columns even if another container handling vehicle 9 occupies a location above a grid column neighboring the grid column row along which the first container handling vehicle is traveling. Alternatively, container handling vehicles of cantilever construction can also be used.

Figure 11:
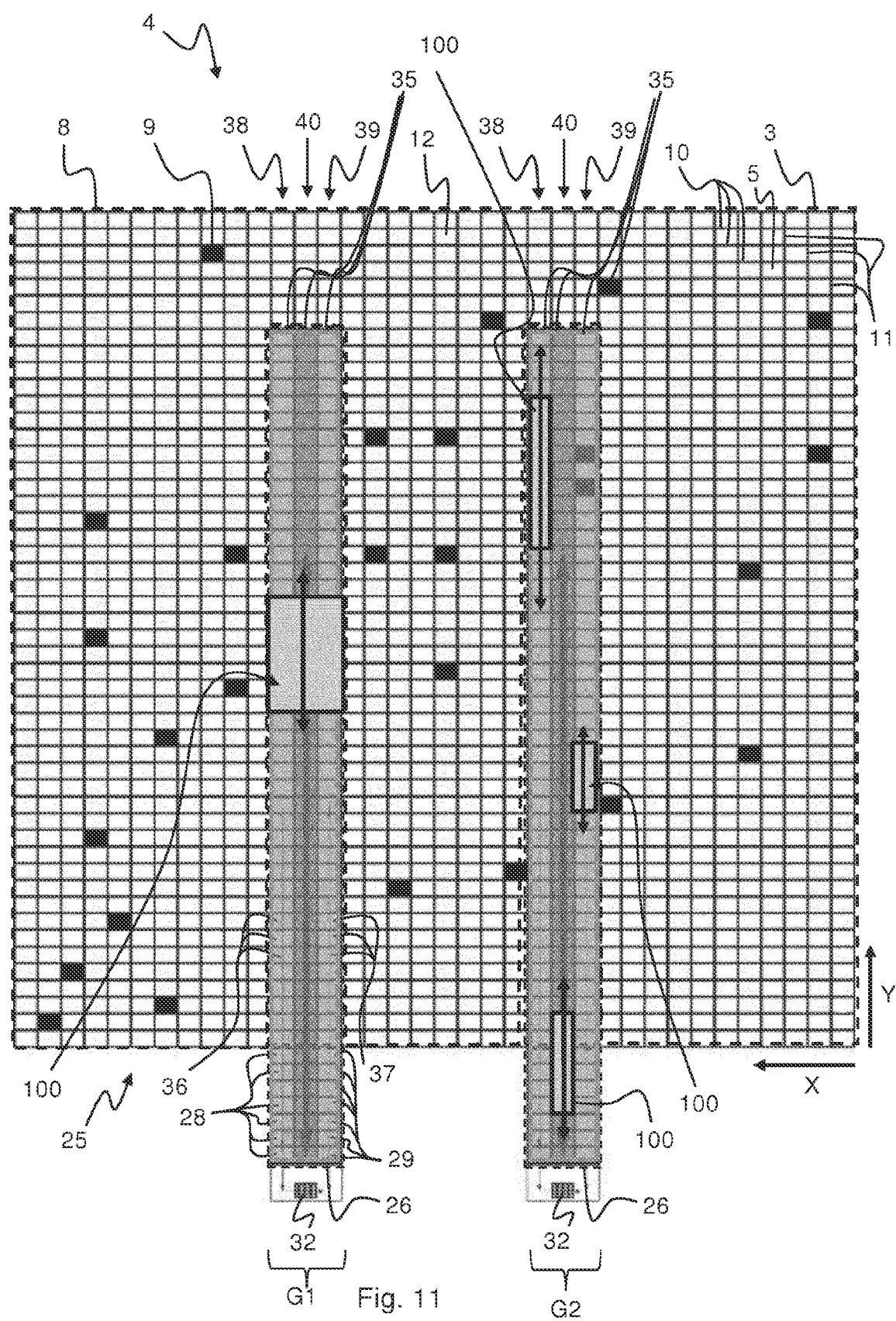
FIG. 11 is a top view of grid of an automated storage and retrieval system according to one embodiment of the invention.

In the disclosed embodiment of FIG. 11, the grid 4 or rail system 8 comprises a storage zone 25, two port zones 26 and two transfer or buffer zones 35. Each port zone 26, which is, for example, three grid cells wide in the X direction and seven grid cells long in the Y direction, comprises ports 28, 29 where storage containers can be transferred out of or into the grid 4. Each transfer zone 35, the function of which is discussed in more detail below, is three grid cells wide (rows denoted 38, 39, 40 in the X direction) and 43 grid cells long (in the Y direction) in the example shown. The storage zone 25, which makes up the rest of the rail system 8, comprises storage columns 5 in which storage containers or bins 6 can be stacked one on top of another to form stacks 7.

Figure 5A:
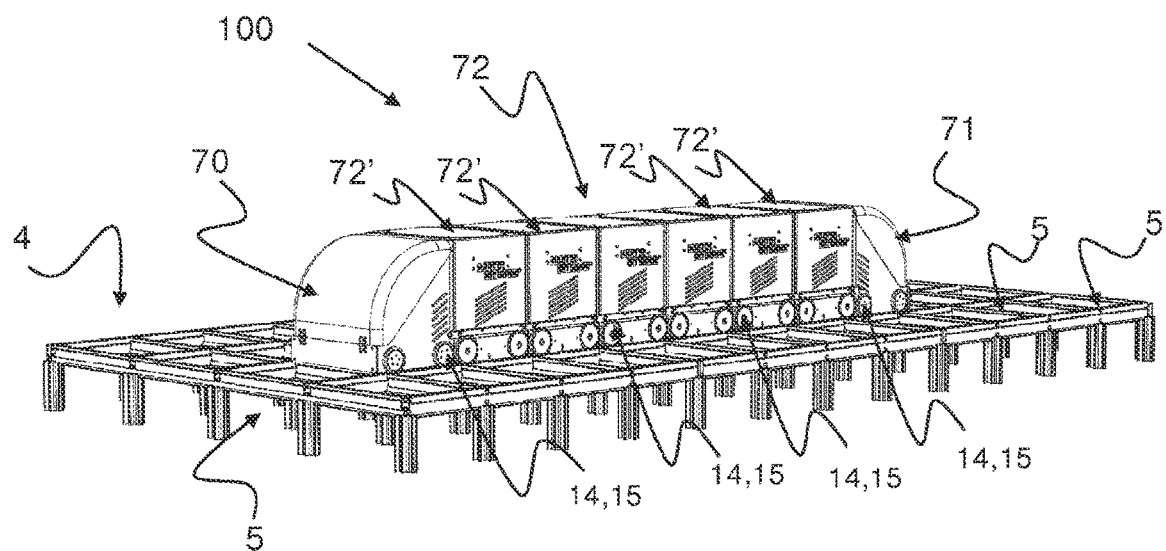
FIG. 5A is a perspective view of an exemplary system according to the invention, showing a first drive vehicle connected to a first end of a trolley assembly comprising six trolleys and a second drive vehicle connected to an opposite second end of the trolley assembly.
Figure 5B:
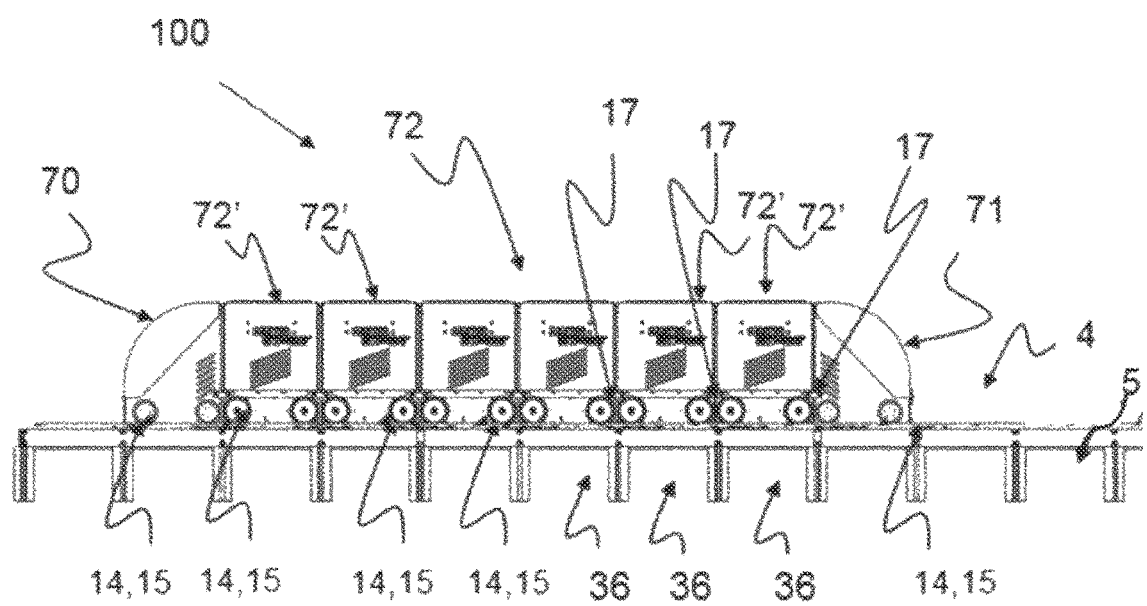
FIG. 5B is a side view of the system of FIG. 5A.
Figure 5C:
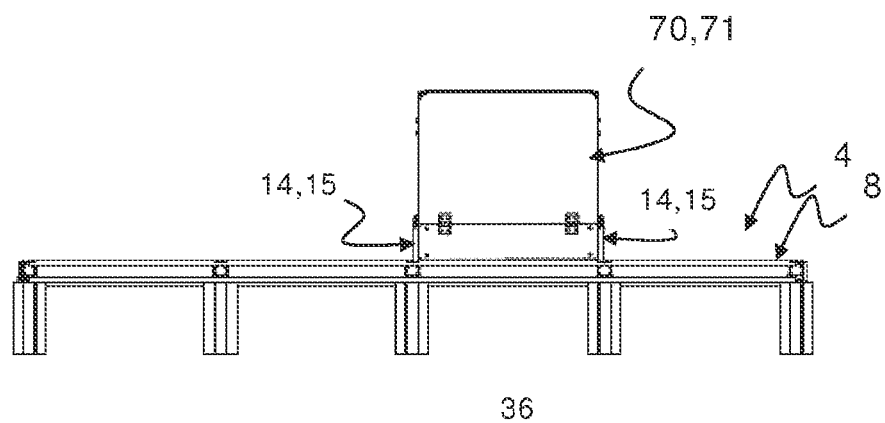
FIG. 5C is an end view of the system of FIGS. 5A and 5B.
Figure 5D:
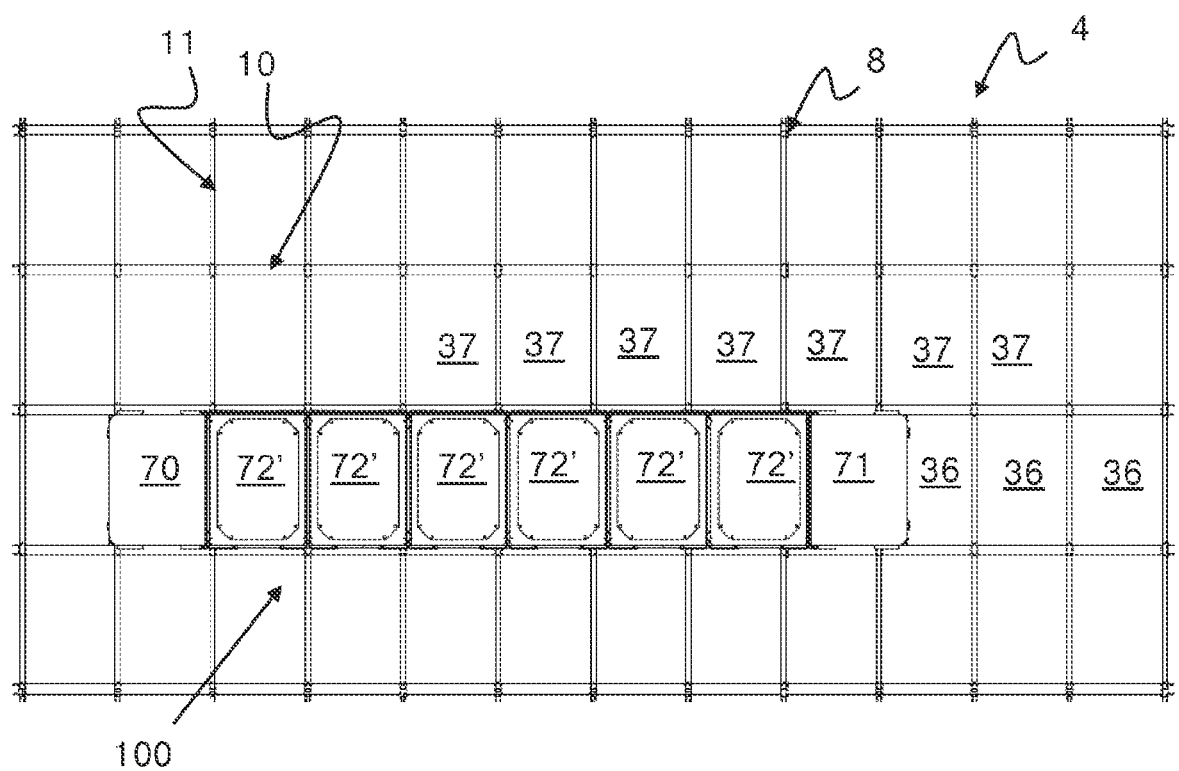
FIG. 5D is a top view of FIGS. 5A-5C.

FIGS. 5A-5D show example of a system according to the invention. FIG. 5A shows a first drive vehicle 70 connected to a first end of a trolley assembly 72 comprising six trolleys 72' connected to each other and a second drive vehicle 71 connected to an opposite second end of the trolley assembly 72. This setup is generally denoted as a 'multi trolley vehicle' with reference number 100. However, the multi trolley vehicle 100 in the simplest form, may have only one drive vehicle and a trolley assembly 72 comprising one trolley 72'. FIG. 5B is a side view of the system of FIG. 5A. FIG. 5C is an end view of the system of FIGS. 5A and 5B, while FIG. 5D is a top view of FIGS. 5A-5C.

It is disclosed an automated storage and retrieval system comprising a three-dimensional grid 4 comprising a plurality of storage columns 5 in which storage containers are stored one on top of another in vertical stacks (see FIG. 1 for detailed view of storage containers 6 and stacks 7). Each trolley 72' comprises moving devices, such as a first set of wheels 14, 15, and are arranged to transport the storage containers 6. The first and second drive vehicles 70, 71 comprise motorized moving devices, in FIG. 5A shown as motorized first set of wheels 14, 15. Preferably, the first drive vehicle 70 is arranged to transport the trolley assembly 72 in a first direction, and the second drive vehicle 71 is arranged to transport the trolley assembly 72 in a second direction, which second direction is opposite the first direction. However, in cases with only one drive vehicle 70, 71, the one drive vehicle can drive in both directions (i.e. both pushing and pulling the trolley assembly 72). In yet another aspect the drive vehicle(s) 70, 71 and trolley assembly 72 can drive in both X and Y directions. According to this latter aspect, the drive vehicles and trolleys can be provided with two set of wheels, one set for each X and Y directions where the set of wheels not used can be temporarily lifted up from contact with the rails, as is known in the art.

The first and second drive vehicles 70, 71 are connectable to a first end of the trolley assembly 72 via connections 17. Alternatively, the drive vehicle(s) 70, 71 can be connected partway or midway within the trolley assembly (72). The connection 17 between each trolley 72' in the trolley assembly 72 and any of the first drive vehicle 70 and second drive vehicle 71 allows a certain degree of movement between two adjacent trolleys 72' and or the first or second drive vehicle 70, 71, in at least one direction. In the disclosed embodiment it is shown a single bracket which is connected to respective adjacent trolleys 72' and/or drive vehicle 70, 71. The multi trolley vehicle 100 is arranged to transport the storage containers 6 between a storage column 5 (exemplified as a transfer column 36 in a transfer zone 35 and at least one deployment area (see FIGS. 16A-16C for illustrations of different deployment areas).

The transfer columns 36, 37 in the transfer zones 35 are preferably standard columns 5, and the location of the transfer columns 36, 37 in the grid or on the rail system 8 can be computer operated, thereby the position of the transfer zone 35, and thus the transfer columns 36, 37, can be programmed to be at the most convenient location, and can be continuously changed. The transfer columns 36, 37 can further be along more than one row, e.g. 2, 3 or more parallel rows, either neighboring rows or not. The transfer zone 35, and thus the transfer columns 36, 37, can thus preferably be moved along the same row as the direction of travel of the at least first vehicle 70, 71 and trolley assembly 72, i.e. the multi trolley vehicle 100. The location of the transfer zones and transfer columns 36, 37 are thus preferably always temporarily. This renders possible freeing up area in the grid, dependent on the operation of the container handling vehicles 9 and or other vehicles moving on the rail system 8.

The multi trolley vehicle(s) 100 is arranged to travel rectilinearly on or above the rail system 8 along at least one row 40 of said grid columns. Each drive vehicle 70, 71 can occupy a single cell or more than one cell in the direction perpendicular to the driving direction. Similarly, each trolley 72' can occupy a single cell or more than one cell in the direction perpendicular to the driving direction. The drive vehicle(s) 70, 71 can occupy more or less rows than the trolleys 72'.

As is disclosed in FIG. 5B, the trolleys 72' are shown as having equal extension in the travel direction of the multi trolley vehicle 100 as one single cell, i.e. the area occupied by one trolley 72' is not extending outside a single cell. In this setup, neighboring trolleys 72' may pick up storage containers 6 from neighboring storage columns 5.

Figure 6A:
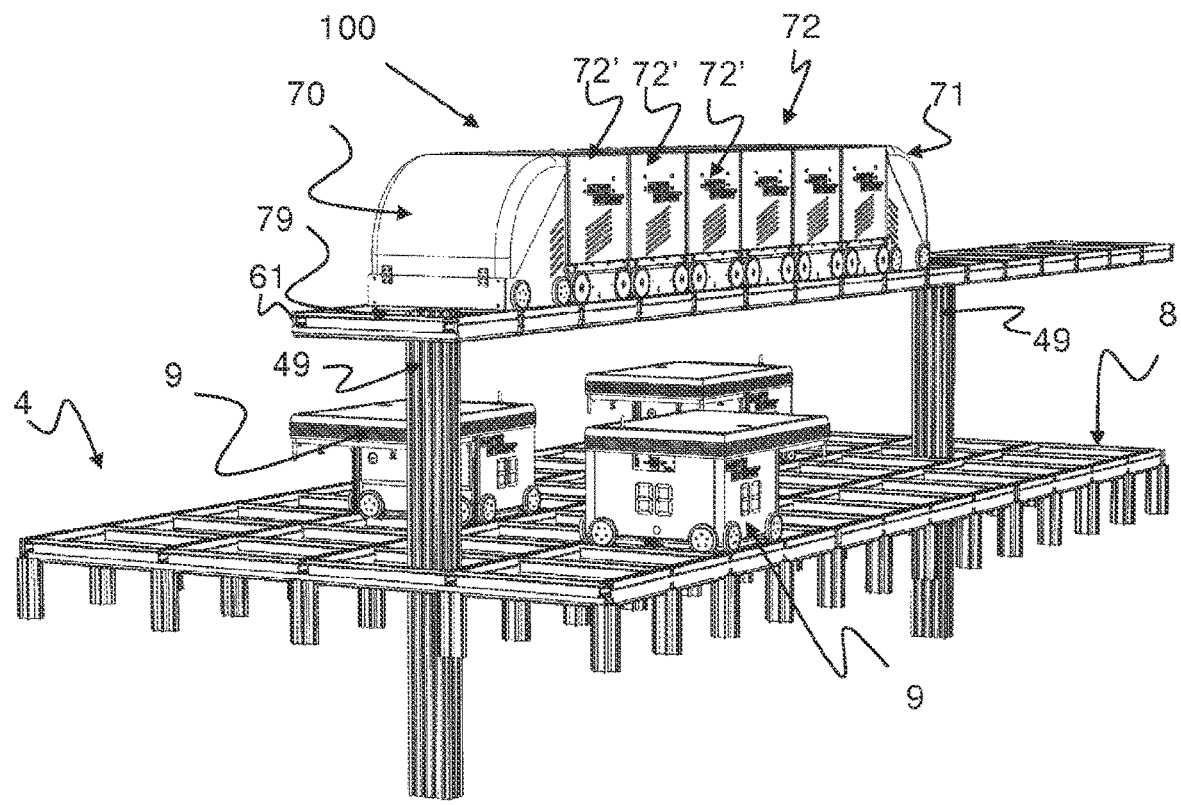
FIG. 6A is a perspective view of an embodiment of the invention where a multi trolley vehicle comprising a first and second drive vehicle connected at each end to a trolley assembly moves on a double rail above the rail system where container handling vehicles operates.

FIG. 6A is a perspective view of an embodiment of the invention where a multi trolley vehicle 100 having a first and second drive vehicle 70, 71 connected at each end to a trolley assembly 72 moves on a double rail 79 above the rail system 8 where container handling vehicles 9 operates.

Figure 6B:
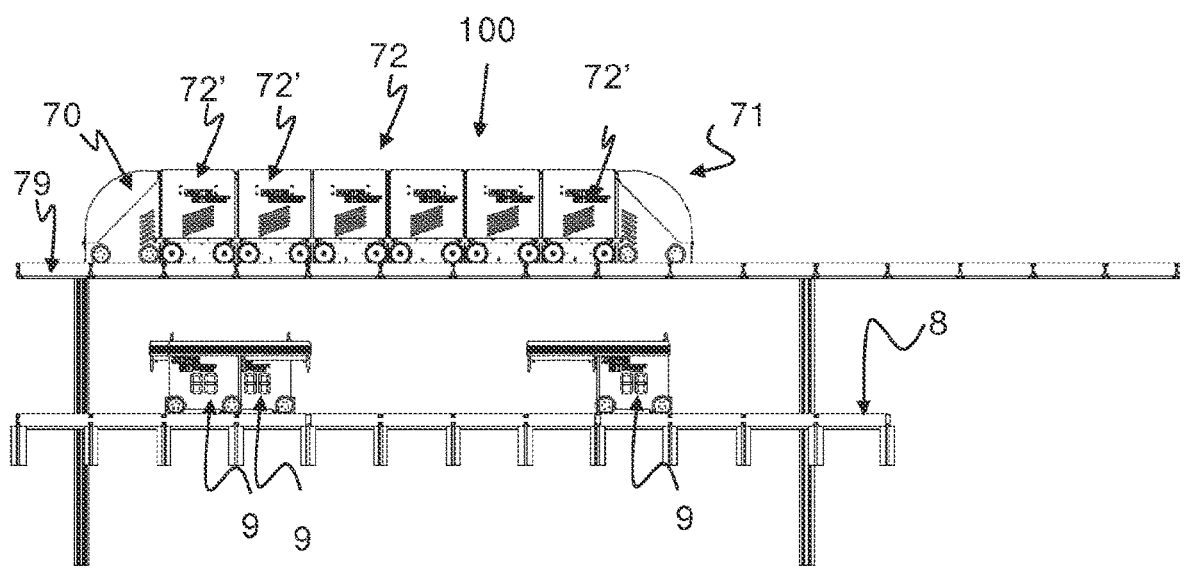
FIG. 6B is a side view of the embodiment in FIG. 6A.

FIG. 6B is a side view of the embodiment in FIG. 6A.

Figure 7A:
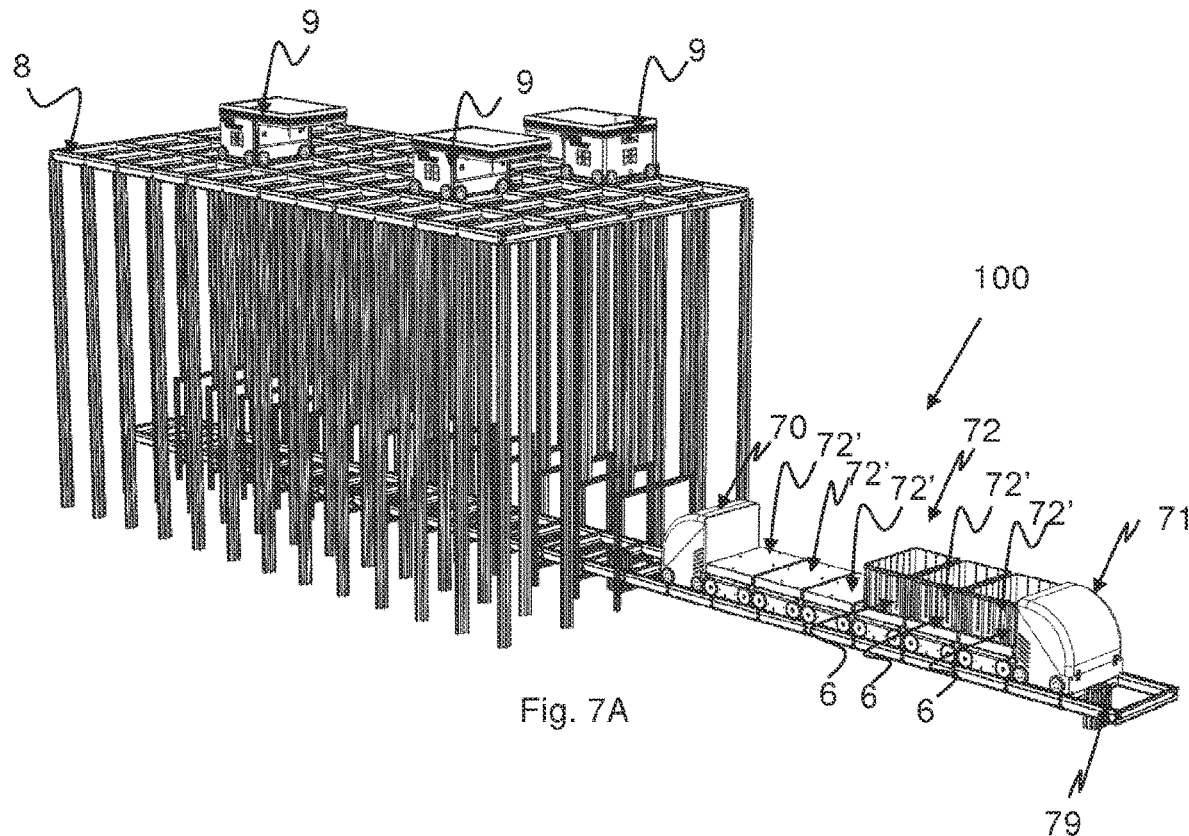
FIG. 7A is an example of an embodiment of the invention where storage containers are lowered down onto the trolleys in the trolley assembly by container handling vehicles.
Figure 7B:
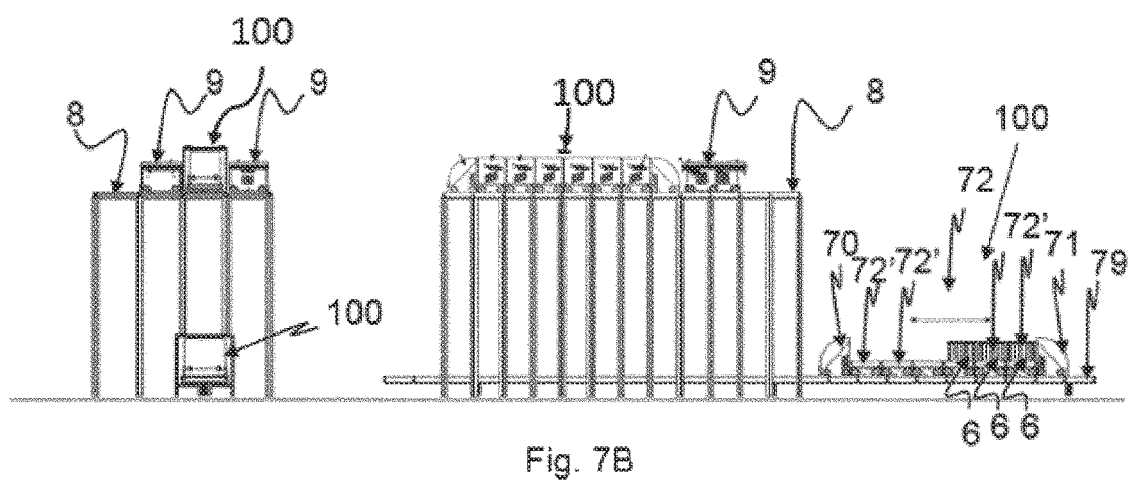
FIG. 7B is an example of an embodiment of the invention where storage containers are lowered down onto the trolleys in the trolley assembly by container handling vehicles or an upper multi trolley vehicle operating in a horizontal plane above the trolley assembly in a lower multi trolley vehicle.

FIGS. 7A and 7B are examples of an embodiment of the invention where storage containers 6 are lowered down onto the trolleys 72' in the trolley assembly 72 by container handling vehicles 9 or another, i.e. an upper multi trolley vehicle 100 (FIG. 7B), which container handling vehicles 9 and multi trolley vehicle 100 operate on a rail system 8 located above a double rail 79 where the multi trolley vehicle 100 operates. FIG. 7A is a perspective view, while the two figures on FIG. 7B are, respectively, in the direction of travel of the multi trolley vehicle 100 (to the left), and a side view of FIG. 7A (to the right). As is disclosed in FIGS. 7A and 7B, each trolley 72' in the lower trolley assembly 72 may either comprise open-top boxes (see details in FIG. 7A, the three boxes closest to the second drive vehicle 71) which can receive storage containers 6 from above or, alternatively, the trolleys 72' in the trolley assembly 72 can have a receiving surface in the form of a platform or bed possibly provided with connecting elements and/or friction elements for receiving the storage containers 6 (see details in FIG. 7A, the three trolleys 72' closest to the first drive vehicle 70).

Instead of transporting storage containers 6 away from the rail system, the multi trolley vehicle 100 may transport storage containers 6 to the rail system, where storage handling vehicles 9, or other devices with lifting devices, can retrieve the storage containers 6 from the trolley assembly 72 and place them in dedicated storage columns 5 in the grid 4.

As an alternative to receiving storage containers from the depicted storage handling vehicles 9 in FIG. 7A, other vehicles operating on the rail system 8, such as another multi trolley vehicle 100 (FIG. 7B) or a port access vehicle (see for example FIG. 12), may lower or retrieve the storage containers 6 to and from the trolleys 72'.

Figure 8A:
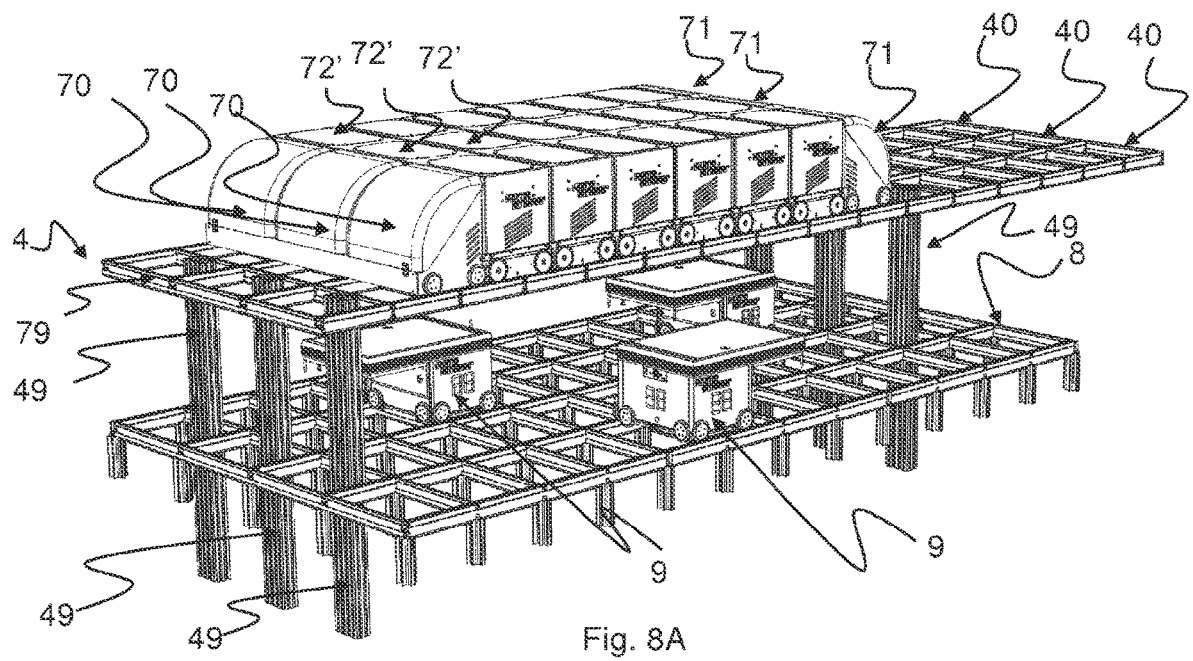
FIG. 8A is a perspective view of a first and second drive vehicle connected at opposite ends of a trolley assembly driving on a double rail consisting of three parallel rows a level above the rail system.
Figure 8B:
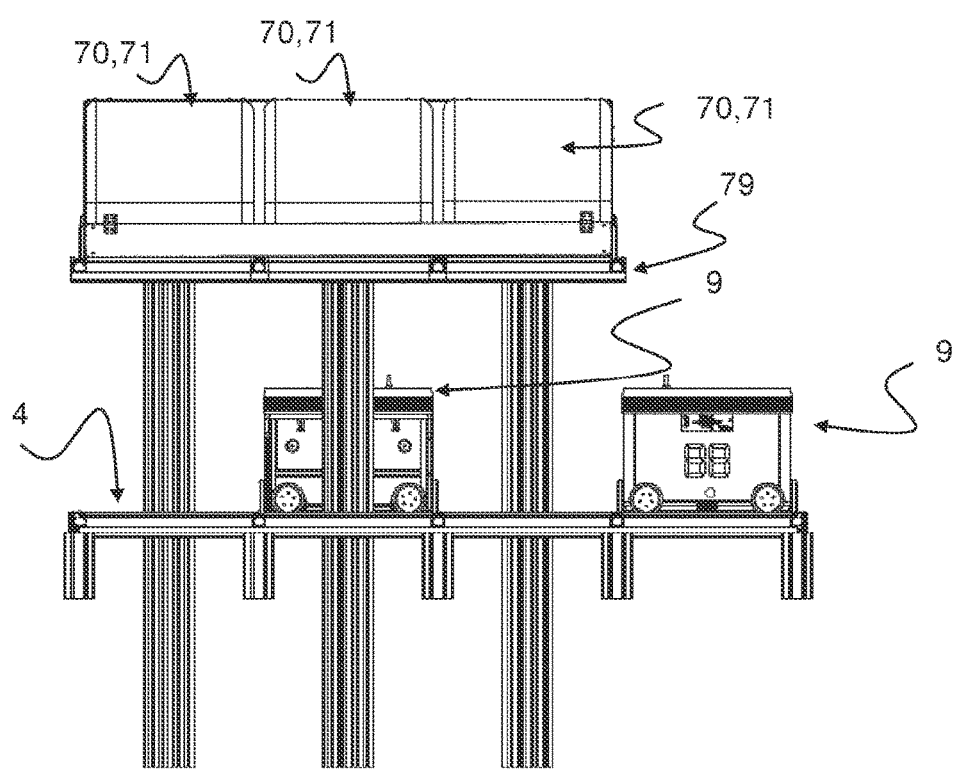
FIG. 8B is an end view of the drive vehicle, double rail and rail system of FIG. 8A.

In the embodiment of FIGS. 7A and 7B, it is clear that the multi trolley vehicle 100 can function as a conveyor belt, for example in the port zone, rendering the use of traditional conveyor belts in this area superfluous. This is rendered possible by for example allowing the trolley assembly 72 to cooperate with one or more lifting arrangements, for example the container handling vehicles 9 or another multi trolley vehicle 100 where the trolleys comprise lifting devices, the port access vehicle 45, any vehicle located in a horizontal plane above where disclosed lower multi trolley vehicle 100 operates. If another multi trolley vehicle 100 is used, this multi trolley vehicle 100 (i.e. the disclosed upper multi trolley vehicle 100 in FIG. 7B) preferably operates in the same X and Y rows but in different Z locations as the disclosed lower multi trolley vehicle 100. e.g. operating in the same plane as the disclosed container handling vehicles and the upper multi trolley vehicle 100 operate (as disclosed in FIG. 7B). With reference to FIGS. 8A and 8B, the multi trolley vehicle 100 may occupy one row, or may extend over more than one row 40, e.g. 1, 2, 3, 4, 5 . . . 10 rows to increase the transport capacity. Thus, the size of the at least one trolley 72' may occupy a single cell or one trolley 72'may occupy more than one cell both in the direction of travel and/or in the direction perpendicular to the direction of travel (i.e. in the X and/or Y directions on the rail system 8). In the latter case, each trolley 72' can be provided with a plurality of lifting devices, e.g. elevators (for example as disclosed in FIGS. 2B and 2C or elevators connected to a top end of the trolley 72' for lifting and lowering storage containers 6 between a column in the grid or rail system 8 and volume compartment for fully containing a storage container in the trolley 72'), for lifting and lowering storage containers 6 between a column 5 in the grid 4 and the trolley 72', which number of lifting devices correspond to the number of cells occupied by the trolley 72'.

The double rail 79 is disclosed supported on dedicated support legs 49, but may also be suspended from the ceiling, be fastened to the walls, be mounted on the grid structure etc. In general, transporting the storage containers 6 between the transfer columns 36, 37 or any other storage column 5 and the deployment area in a substantially horizontal plane, for example on a double rail 79, which is located above or below the container handling vehicles 9, i.e. above or below the plane where the container handling vehicles 9 travel across the grid 4, any interference on the transfer of the storage containers 6 between the transfer columns 36, 37 and the deployment area may have on the movement of the container handling vehicles 9 will be minimized.

Not including the port zones 26, the grid 4 in the example of FIG. 11 is 36 cells wide in the X direction and 50 cells long in the Y direction. In the Z direction (cf. FIG. 12), the grid 4 may have a height of five cells. It is understood, however, that the grid 4, in principle, can be of any size. In particular, it is understood that grid 4 can be considerably wider and/or longer than disclosed in FIGS. 5 and 6. For example, the grid may have a horizontal extent of more than 600×600 grid cells. Also, the grid 4 can be considerably deeper than disclosed in FIG. 12. For example, a grid may be more than 10 grid cells deep (in the Z direction). In the embodiment of FIG. 11, multi trolley vehicles 100 with drive vehicles 70, 71 and trolley assemblies 72 can travel along any one or more of rows 38, 39, 40 in the transfer zone 35, and the transfer zone 35 can be e.g. any one of rows 38, 39 and or 40 (or alternatively additional rows). In the specific embodiment of FIG. 11, the transfer zone 35 to the left in the Figure, i.e. denoted G1, discloses a multi trolley vehicle 100 which is three cells wide (X-direction) and seven cells long (Y-direction). Thus, the multi trolley vehicle 100 serves all three rows 38, 39, 40 in transfer zone 35. In transfer zone 35 to the right in the Figure, i.e. denoted G2, there are three multi trolley vehicles 100 serving the transfer zone 35, with one multi trolley vehicle 100 in each of the rows 38, 39, 40, including: in row 38 a multi trolley vehicle 100 which is one cell wide and nine cells long, in row 40 a multi trolley vehicle 100 which is one cell wide and 6 cells long, and in row 39 a multi trolley vehicle 100 which is one cell wide and 4 cells long. It is also possible that the multi trolley vehicle 100 could be one cell long and 2 or more cells wide.

Alternatively, the multi trolley vehicles 100 with at least one drive vehicle 70, 71 and trolley assembly 72 can travel along rows 38 and 39, while a port access vehicle 45 (features of the port access vehicle 45 explained in greater detail below) can be arranged to travel, or be fixed at particular columns, along row 40 for cooperation with the multi trolley vehicles 100.

Each transfer zone 35 comprises transfer columns 36, 37 arranged to temporarily hold storage containers 6 when in transit between the storage zone 25 and the port zones 26. The transfer columns include drop-off columns 36 where the container handling vehicles 9 can drop off storage containers retrieved from the grid 4, and pick-up columns 37 where the container handling vehicles 9 can pick up storage containers 6 to be stored in the grid 4.

The drop-off columns 36 are arranged in a row 38 extending in the Y direction from the exit ports 28. The pick-up transfer columns 37 are arranged in a row 39 extending in the Y direction from the entry ports 29. An intermediate column row of grid columns 40 is positioned between rows 38 and 39. In other words, the drop-off columns 36 and the pick-up columns 37 are separated by the intermediate column row 40.

In the disclosed embodiment, the drop-off columns 36 and the pick-up columns 37 occupy positions Y=1 to Y=43 in each row 38 and 39. Consequently, the drop-off columns 36 and the pick-up columns 37 are 43 grid cells long, i.e. they extend 43 grid cells into the transfer zone 35. Since the number of drop-off and pick-up columns 36, 37 is larger than the number of ports 28, 29, the likelihood of a container handling vehicle 9 not finding a vacant drop-off column 36 where it can deliver a storage container is low.

FIG. 11 also discloses an example of a port zone 26 in more detail. Each port zone 26 comprises seven exit ports or exit port columns 28 through which the storage containers 6 can be brought out of the grid 4 to be accessed from outside of the grid 4. Each port zone 26 also comprises entry ports or entry port columns 29 through which storage containers 6 can be brought into the grid 4 to be stored in the storage columns 5. An access and transfer system 31 is arranged for transporting storage containers between the ports 28, 29 and an access station 32, which in the disclosed embodiment is a picking and stocking station. The access and transfer system 31 comprises a first conveyor 33 which is arranged underneath the exit ports 28 to transport storage containers from the exit ports 28 to the access station 32, and a second conveyor 34 which is arranged underneath the entry ports 29 to transport storage containers from the access station 32 to the entry ports 29. The rail system 8 extends into the port zones 26 of the grid 4.

Port access vehicles are operated above the grid 4 for transferring storage containers 6 between the transfer zones 35 and the port zones 26. As will be discussed in more detail in the following, each port access vehicle 45 is arranged to transfer storage containers 6 above the operating plane of the container handling vehicles 9, i.e. in a plane above the operating space of the container handling vehicles 9 and any multi trolley vehicles 100, thus allowing the port access vehicle 45 to transfer a storage container 6 over a drop-off or pick-up transfer column 36, 37 even if a container handling vehicle 9 or multi trolley vehicle 100 occupies the grid location above that drop-off or pick-up transfer column 36, 37. Consequently, multi trolley vehicles 100 and container handling vehicles 9 can be dropping off or picking up storage containers from drop-off or pick-up transfer columns 36, 37 while the port access vehicle 45 simultaneously transfers other storage containers 6 between the transfer zone 35 and the port zone 26 above the container handling vehicles 9.

A port access vehicle 45 which can form part of the system will now be discussed in more detail with reference to FIGS. 4, 11-14.

The port access vehicle 45 may operate along the grid columns in row 40 (cf. FIG. 11), i.e. along a row of grid columns which extend into the grid from the port zone 26. The port access vehicle 45 may comprise a plurality of vehicle sections 46 which are connected in a train-like configuration, i.e. one after the other (e.g. cf. FIG. 12). Each vehicle section 46 comprises a vehicle body 47 which has a footprint which generally corresponds to the lateral extension of a grid column 12, thus allowing the port access vehicle to pass between container handling vehicles 9 or multi trolley vehicles 100 which are dropping off or picking up storage containers in the transfer zone. At the lower end of the vehicle body 47, a set of wheels 48 is mounted and configured to allow the vehicle section 46 to travel on the rail system 8 in the Y direction along row 40.

In the train of vehicle sections 46 making up the port access vehicle 45, the set of wheels 48 of at least one the vehicle sections 46 is motorized in order to propel the port access vehicle 45.

The vehicle section 46 comprises a horizontal bar or frame 50 which is mounted to the top of the vehicle body 47 and extends horizontally from both sides of the vehicle body 47 orthogonal to the dedicated direction of travel of the vehicle section 46, which dedicated direction of travel is defined by the set of wheels 48. In other words, when in operation on the rail system 8 or e.g. on a monorail above the rail system 8, the horizontal bar 50 extends in the X direction (e.g. cf. FIG. 4). On both sides of the vehicle body 47, the horizontal bar 50 supports a container lifting and holding device 53, 54. Each lifting and holding device 53, 54 comprises a container gripping device 51, 52, which can be lowered from the horizontal bar 50 to grip and hold a storage container 6. The gripping devices 51, 52 can be individually lowered in order to pick up and drop off storage containers independently of each other.

The lifting and holding devices 53, 54 are arranged to hold storage containers in a raised, holding position when the port access vehicle 45 transports the storage containers 6 between the transfer zone 35 and the port zone 26. The vehicle body 47 of the vehicle sections 46 has a vertical extension which is sufficient to allow the lifting and holding devices 53, 54 to hold the storage containers 6 in a holding position which is above the operating space of the container handling vehicles (e.g. cf. FIG. 4).

Figure 9A:
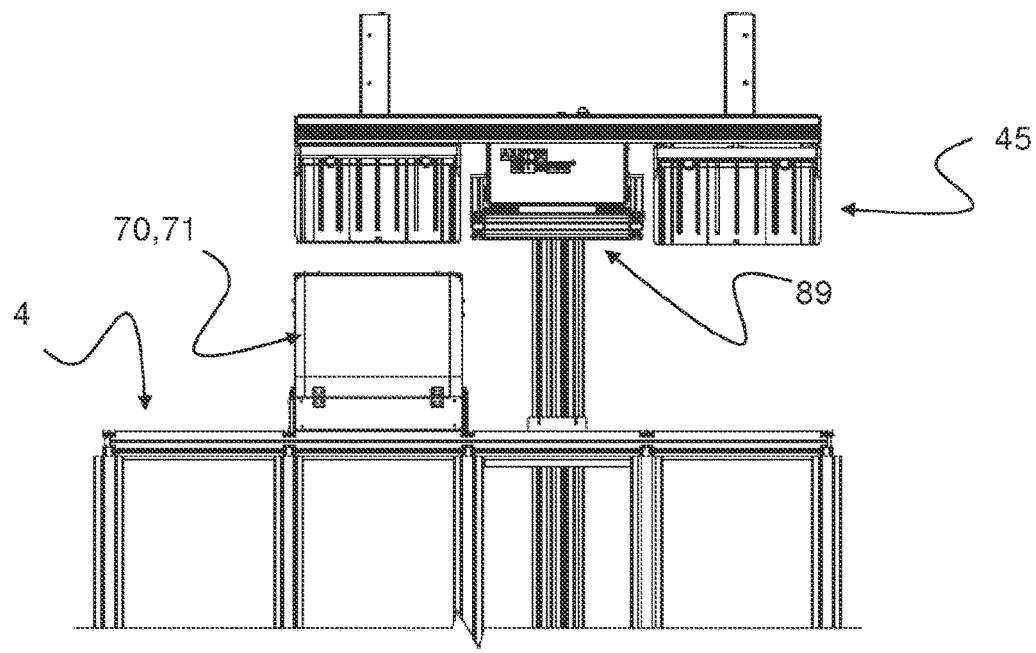
FIGS. 9A-9B are different views of cooperation between a port access vehicle and a drive vehicle with a trolley assembly.
Figure 9B:
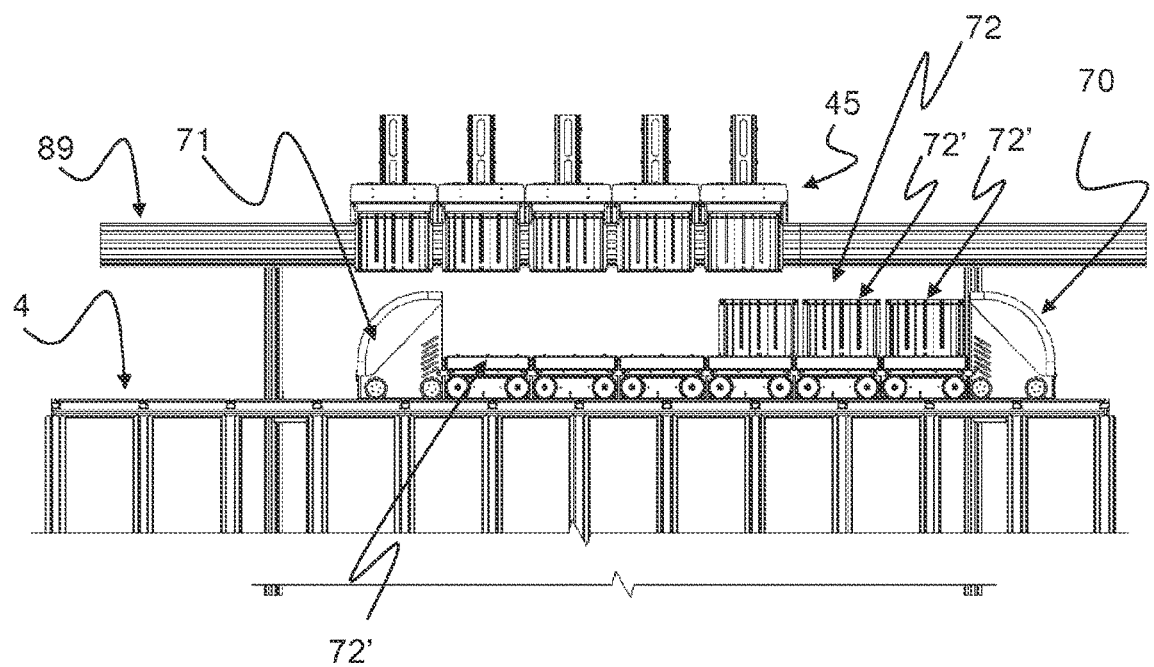

With reference to FIGS. 9A-9B, instead of equipping the trolleys 72' with lifting devices or elevators, each trolley 72' may comprise a closed bottom end and an open top end (see FIGS. 7A, 7B, 9B) for receiving storage containers 6 from above. This is rendered possible by for example allowing the trolley assembly 72 to cooperate with one or more lifting arrangements, for example the port access vehicle 45, or using another multi trolley vehicle 100 located in the same X and Y rows but in different Z locations, i.e. arranged directly below or above. It is advantageous if the lifting arrangement comprises a first lifting device arranged to carry a storage container 6 from one of the transfer columns 36, 37 and position it in or on the at least one trolley 72' for transport to the deployment area, and a second lifting arrangement, e.g. another or the same port access vehicle 45 or a stationary lifting arrangement, arranged at the deployment area for picking up the storage container 6 from the trolley 72'. Similarly, the system can be adapted to transport the storage container 6 from the deployment area to any one transfer columns 36, 37 in the transfer zone 35. The multi trolley vehicle 100 can be used for transporting the storage containers 6 to a deployment area, for example a port 26, where the same or alternatively another port access vehicle 45 can lift the storage containers 6 from the trolleys 72' and place them in respective columns or ports etc. The port access vehicle 45 is then either moved along row 40 or is stationary arranged in the deployment area or a factory area or production facility 80 (see FIG. 16C), e.g. the port zone 26. When the multi trolley vehicle 100 arrives in the port zone 26, the port access vehicle 45 lifts the storage containers 6 from above and lowers the storage container into a grid column which is directly into an exit port column 28 or adjacent an exit port column 28. The target storage container is then lowered into exit port column 28 and positioned on conveyor 33 (see FIG. 12), which transports the target storage container 6 to the access station 32. Instead of a conveyor, it is possible, as discussed above, to use at least one multi trolley vehicle 100 to transport the storage containers 6 to the access station 32. Furthermore, using a multi trolley vehicle 100 instead of e.g. a conveyor belt results in a significantly longer possible operating distance between the exit port column 28 in the grid and the access station 32 (i.e. the access station 32 does not have to be close to the exit port column 28 as the multi trolley vehicle render possible faster and longer possible transport distance between the exit port column 28 and the access station 32 than is possible by using a conveyor belt) as well as a possibly faster transfer of storage containers.

Figure 12:
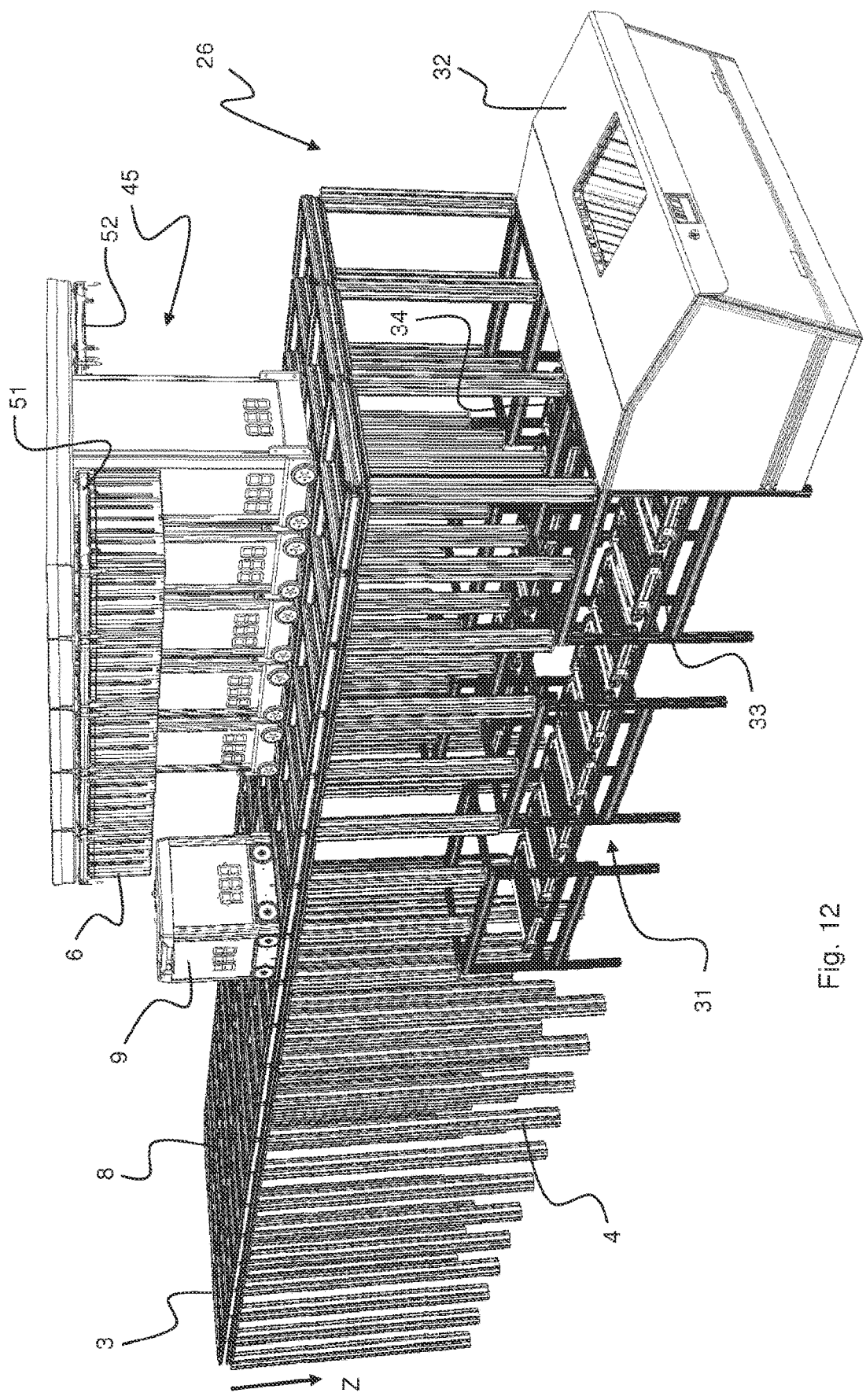
FIG. 12 is a perspective view of a port access vehicle which can form part of the system in accordance with the invention.
Figures 13, 14:
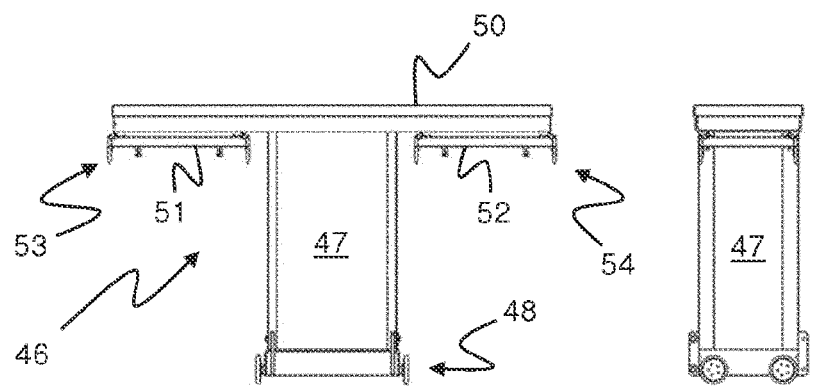
FIGS. 13 and 14 are orthogonal side views of a vehicle section of the port access vehicle in FIG. 12.

With reference to FIG. 12, once accessed at the access station 32, the target storage container is transferred back into the grid 4 to once again be stored in a storage column 5 in the storage zone 25. This operation is essentially the reversal of the above-discussed operation of fetching a storage container from the grid and involves:

transporting the target storage container from the access station 32 to one of the entry port columns 29 using conveyor 34 or a multi trolley vehicle 100 (e.g. by arranging the storage containers horizontally below the different trolleys 72' and using the lifting device(s) in each trolley 72' to lift the storage container 6, or, if the trolley 72' has a closed bottom end an operator can place the storage container(s) directly onto the trolley 72');

positioning the port access vehicle 45 or a multi trolley vehicle 100 in the port zone 26 with the vehicle body 47 of one of the vehicle sections 46 located above a grid column adjacent entry port column 29 or the trolleys 72' located above an entry port column;

lowering the gripping device 52 of the vehicle section 46 or the lifting device of the trolley(s) 72' into the entry port column(s) 29, engaging the target storage container(s) and lifting it/them to the transfer position;

either dropping the storage containers onto trolleys 72' in a trolley assembly 72 using the port access vehicle 45 before transporting the storage containers with the multi trolley vehicle 100 along row 40 from the port zone 26 to the transfer zone 35, where the port access vehicle 45 is positioned so that the vehicle body 47 of the vehicle section 46 holding the target storage container becomes located above a grid column adjacent a pick-up transfer column 37 or, if the trolleys 72' are provided with lifting devices, transporting the storage containers 6 with multi trolley vehicle 100 directly along rows 38, 39 or 40 from the port zone 26 to the transfer zone 35 with the trolleys 72' directly above pick-up transfer column(s);

lowering the target storage container(s) 9 into the pick-up transfer column(s) 37;

instructing a container handling vehicle 9 to move to the pick-up column 37 and retrieve the target storage container(s); and moving the container handling vehicle 9 to the storage column(s) where the target storage container(s) is/are to be stored and positioning the target storage container(s) in its intended position in the stack.

Figure 10:
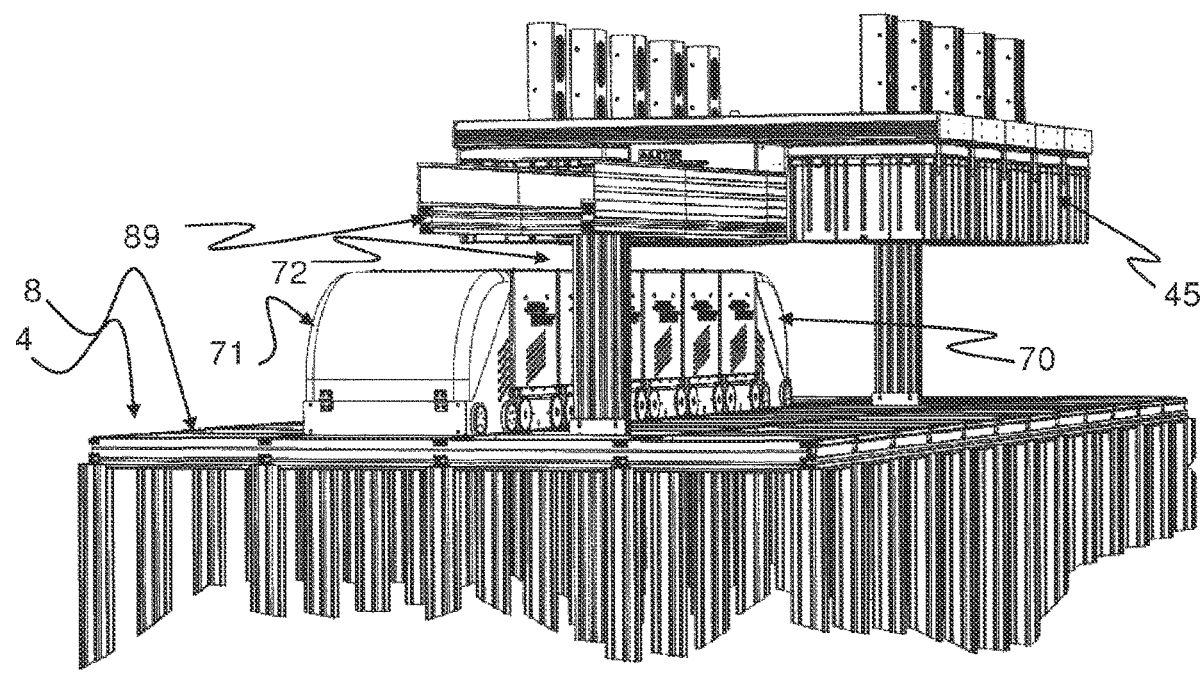
FIG. 10 is a perspective view of FIGS. 9A and 9B.

The port access vehicle 45 may be operated on the grid, e.g. be arranged to travel along the rail system 8 of the grid. However, as disclosed in FIGS. 9A and 9B and 10, the port access vehicle 45 may be operated on a monorail 89 (or other form of overhead rail system) arranged in a horizontal plane above the rail system 8 and the multi trolley vehicle 100 can be operated on the rail system 8.

When the container handling vehicle 9 has positioned the target storage container in the drop-off transfer column 36 and left the transfer zone 35, e.g. to retrieve another storage container 9 from the grid 4, the multi trolley vehicle 100 is moved along its dedicated row, i.e. row 38, 39 or 40 and positioned with one of its trolleys 72' located above the grid column which is at the same drop-off transfer column 36 in which the container handling vehicle 9 has positioned the target storage container. One of the trolleys 72' then retrieves the target storage container 6 from the drop-off transfer column 36 by lowering the lifting device, gripping the target storage container and raising it into the compartment in the trolley. Similarly, if the footprint of the trolleys 72' occupy maximum one cell the other trolleys 72' can pick up storage containers from neighboring columns in the same row(s) in the transfer zone 35. The multi trolley vehicle 100 is then moved to e.g. port zone 26 where the trolleys 72' lower the storage containers 6 into exit port column(s) 28 and positions the storage container(s) 6 on for example a conveyor 33 or a multi trolley vehicle 100, which transports the target storage container(s) to the access station 32.

In the transfer zones 35, the storage containers 9 are advantageously stored in the uppermost layer of the grid, i.e. in the layer identified as Z=1. This will minimize the distance the gripping devices of the container handling vehicles 9, the trolleys 72' in the multi trolley vehicle 100 and port access vehicle 45 needs travel when dropping off and picking up storage containers 6 in the transfer zone 35, which will allow for rapid turnaround of the storage containers temporarily stored therein.

In order to allow the storage containers to be temporarily stored in the uppermost layer in the respective transfer columns, each transfer column may comprise stopping devices (not shown), e.g. clamps attached to the upright members 2 surrounding each transfer column, which clamps prevent the storage container from being lowered into the transfer column beyond level Z=1. Of course, the clamps can be attached to the upright members deeper down the transfer column, thus allowing the storage containers to be temporarily stored at deeper levels than Z=1. Alternatively, this temporary storage can be achieved by stacking a plurality of empty storage containers up to the location Z=1 in all of the storage columns 5 defined by the transfer zone 35.

The storage containers can be temporarily stored at different levels in different transfer columns. Also, in some applications it may be advantageous to simultaneously store more than one storage container in a transfer column. However, in such an application the trolley 72' needs to be configured to carry out a digging operation in order to retrieve a storage container temporarily stored below another temporarily stored storage container.

Due to the modular character of the multi trolley vehicle 100, the multi trolley vehicle 100 can be easily adapted to different transfer zone sizes and/or deployment area configurations by adding or removing trolleys 72'. Consequently, the multi trolley vehicle 100 can be configured to simultaneously transfer a plurality of storage containers between the transfer zone 35 and the deployment area. For example, when traveling from the transfer zone 35 to the port zone 26, each trolley 72' can be employed to carry a storage container. Likewise, when traveling from the port zone 26 to the transfer zone 35, each trolley 72' can be employed to carry a storage container.

Figure 15:
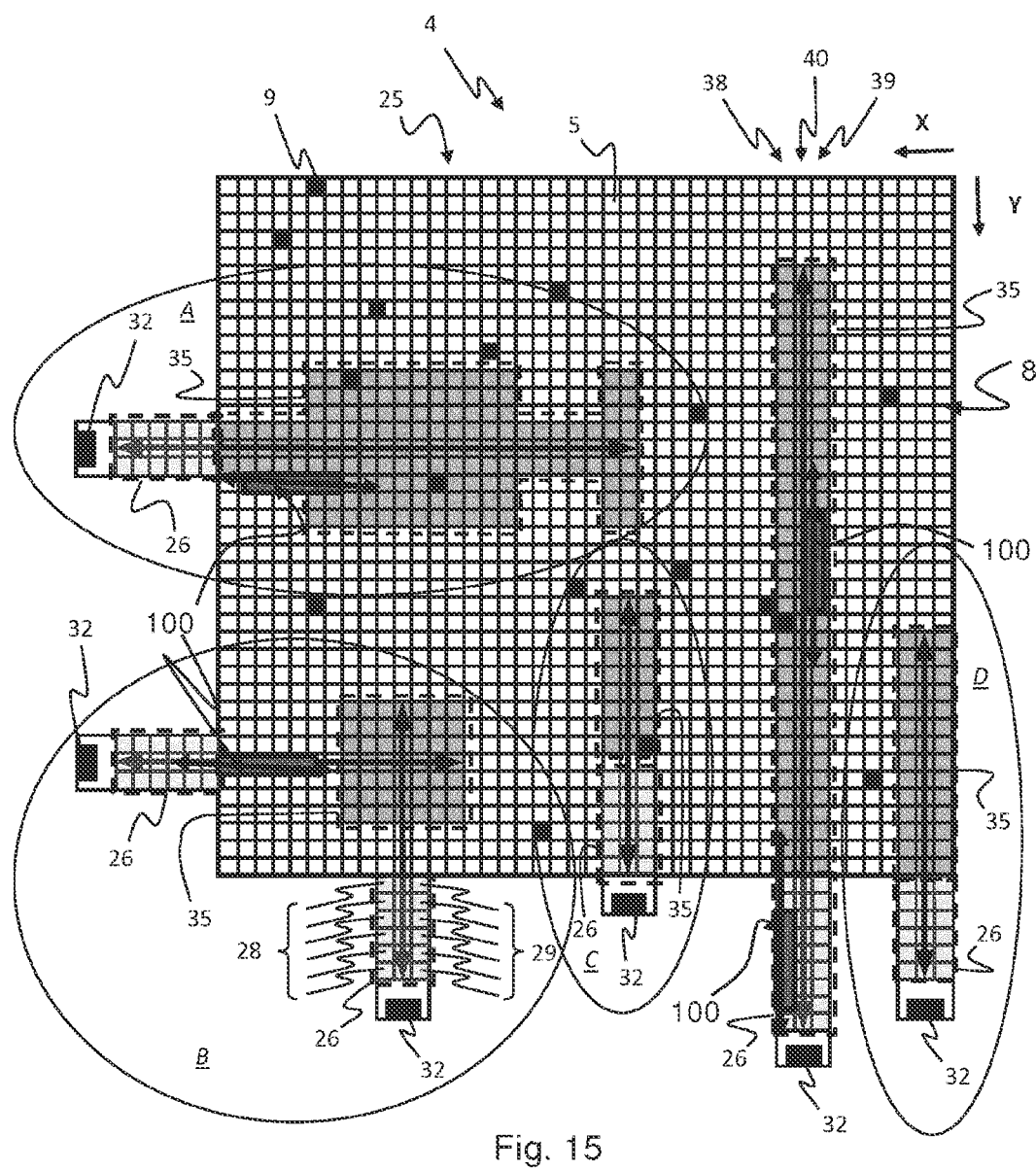
FIG. 15 is a top view of a rail system on top of a grid showing different transfer zone configurations.

FIG. 15 is a top view of a grid 4 of an automated storage and retrieval system according to the invention where possible positions and shapes of transfer zones 35 and port zones 26 are indicated. Areas shaded dark grey indicate transfer zones 35 and areas shaded light grey indicate port zones 26. Each port zone comprises ports 28, 29 and each transfer zone 35 comprises transfer columns arranged in rows. In the disclosed example each transfer zone 35 is associated with at least one port zone 26. White grid cells indicate storage columns 5 defining the grid's storage zone 25. Automated container handling vehicles 9 are operated on the grid 4 or rail system 8 as previously discussed, i.e. to transport storage containers 6 between the storage columns 5 and the transfer zones 35 and are shown as black grid cells. Double arrows extending along the port and transfer zones indicate the operation of port access vehicle operating as previously discussed, i.e. to transport the storage containers between the transfer zones 35 and the port zones 26. Dark grey grid cells indicate multi trolley vehicles 100 operating on the grid between the transfer zone 35 and the port zone 26.

The region labelled A shows a transfer zone 35 with a non-rectangular shape. Since the length of the transfer zone 35 in the Y direction exceeds three rows, the port access vehicle 45 serving the transfer zone 35 should be configured with bars or frames extending or being extendable in the Y direction in order to access the outermost drop-off and pick-up transfer columns. The bars may for example be telescopically extendible bars. The region labelled B shows a squared-shaped transfer zone 35 which may be accessed by two port access vehicles, one operating in the X direction and one in the Y direction. The region labelled C shows a configuration where the port zone 26 does not form an extending portion of the grid 4. The region labelled D shows a transfer zone 35 which is located adjacent the grid circumference.

Figure 16A:
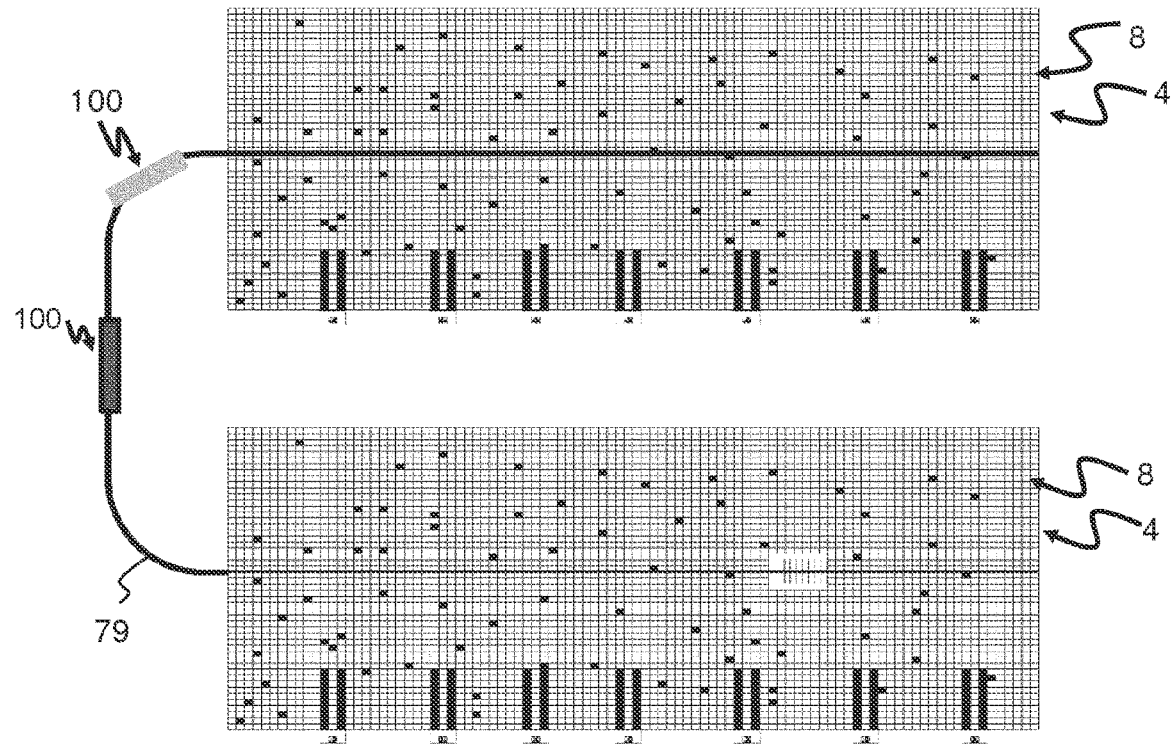
FIGS. 16A, 16B and 16C show examples of different deployment areas, where
Figure 16B:
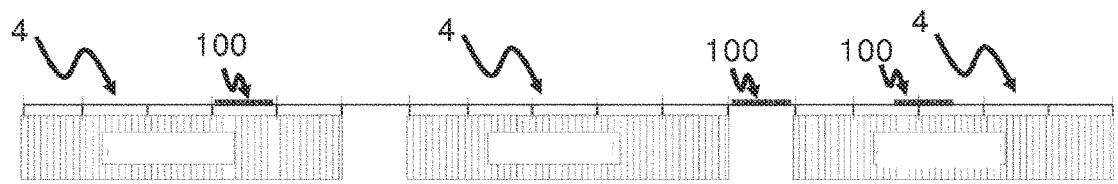
Figure 16C:
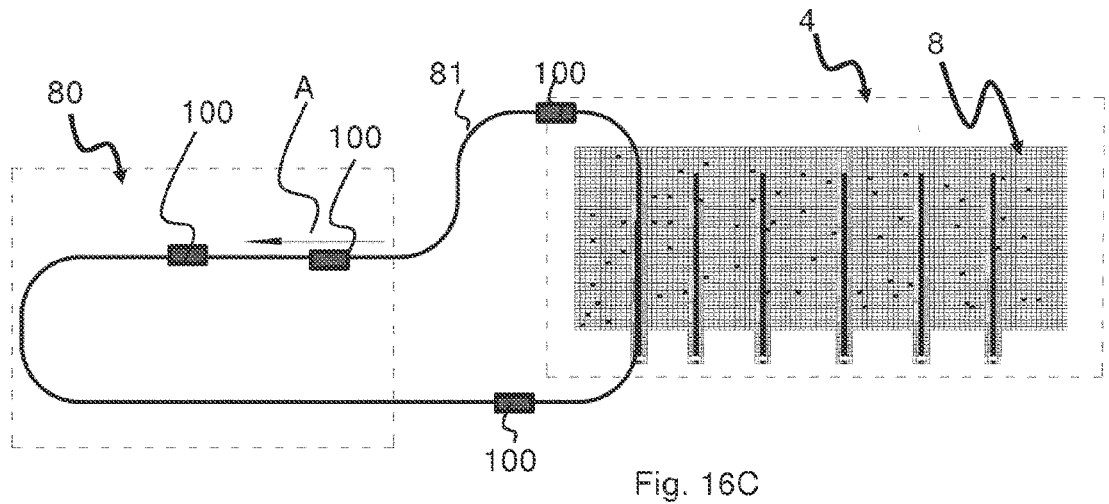

FIGS. 16A, 16B and 16C show examples of different deployment areas. FIG. 16A shows a deployment area being another grid system 4 (for example another storage system or warehouse) with a double rail 79 between the grid or rail systems 4, 8. Another double rail (not shown in the Figure) can be arranged at another level than the disclosed double rail 79. One or more multi trolley vehicles 100 (indicated in shaded grey on the Figure) can operate on the double rail 79. FIG. 16B shows the deployment areas being two other storage/warehouse systems with dedicated grid systems 4 and with a double rail between the different grid systems 4 in the different storage systems. FIG. 16C shows the deployment area being a factory area or production facility 80 where the multi trolley vehicles 100 are configured to drive on a double rail formed as a loop between the grid or rail system 4, 8 and the factory area or production facility 80. The arrow A in FIG. 16C indicates the direction of travel along the loop 81 for the multi trolley vehicles 100. If it is a single double rail between the grid system 4 and the factory area or production facility 80, it is advantageous that the different multi trolley vehicles 100 travel in the same direction to avoid collision etc. However, if there are multiple rails either on the same level or at different levels the different multi trolley vehicles 100 can travel in both directions on the rail(s). It shall be noted that the relative large size of the multi trolley vehicles 100 compared to the rails in FIGS. 16A-16C are for illustrative purposes only and it is clear that the multi trolley vehicle 100 can be of less width (e.g. the same width as the rail).

In the preceding description, various aspects of an automated storage and retrieval system according to the invention have been described with reference to the illustrative embodiment. However, this description is not intended to be construed in a limiting sense. Various modifications and variations of the illustrative embodiment, as well as other embodiments of the system, which are apparent to persons skilled in the art, are deemed to lie within the scope of the present invention as defined by the following claims.

| | List of references |
|---|---|
| 1 | Framework structure |
| 2 | Upright member |
| 3 | Horizontal member |
| 4 | Storage grid |
| 5 | Storage column |
| 6 | Storage container |
| 7 | Stack |
| 8 | Rail system |
| 9 | Container handling vehicle |
| 10 | First set of rails |
| 11 | Second set of rails |
| 12 | Grid column |
| 13 | Vehicle body |
| 14 | First set of wheels |
| 15 | Second set of wheels |
| 16 | Lifting device (elevator) |
| 17 | Connection |
| 18 | Lifting frame |
| 19 | First port column |
| 20 | Second port column |
| 21 | |
| 22 | Footprint |
| 23 | |
| 24 | |
| 25 | Storage zone |
| 26 | Port zone |

-continued

| List of references | |
|---|---|
| 27 | |
| 28 | Exit port/exit port column |
| 29 | Entry port/entry port column |
| 30 | |
| 31 | Access and transfer system |
| 32 | Access station |
| 33 | First conveyor |
| 34 | Second conveyor |
| 35 | Transfer zone |
| 36 | Drop-off column |
| 37 | Pick-up column |
| 38 | Row |
| 39 | Row |
| 40 | Intermediate column row |
| 41 | |
| 45 | Port access vehicle |
| 46 | Vehicle section |
| 47 | Vehicle body |
| 48 | Set of wheels |
| 49 | Support leg |
| 50 | Horizontal bar or frame |
| 51 | Container gripping device |
| 52 | Container gripping device |
| 53 | Lifting and holding device |
| 54 | Lifting and holding device |
| 61 | Rail structure |
| 70 | First drive vehicle |
| 71 | Second drive vehicle |
| 72 | Trolley assembly |
| 72' | Trolley |
| 79 | double rail |
| 80 | Factory area or production facility |
| 81 | Loop |
| 89 | Monorail |
| 100 | Multi trolley vehicle |
| A | Arrow, direction of travel |

The invention claimed is:

1. An automated storage and retrieval system, comprising:
a rail system comprising a first set of parallel tracks, arranged in a horizontal plane and extending in a first direction, and a second set of parallel tracks, arranged in the horizontal plane and extending in a second direction that is orthogonal to the first direction,
wherein the first and second sets of tracks form a grid pattern in the horizontal plane comprising a plurality of adjacent grid cells, each grid cell comprising a grid opening defined by a pair of neighboring tracks of the first set of tracks and a pair of neighboring tracks of the second set of tracks;
a plurality of stacks of storage containers arranged in storage columns located beneath the rail system, wherein each storage column is located vertically below a grid opening; and
a trolley for transporting the storage containers,
wherein
the trolley is movable on any rail including: on the rail system or in a horizontal plane above or below the rail system, on a double rail above or below the rail system or combinations thereof;
the trolley provides a container volume for storing at least one of the storage containers; and
the trolley comprises moving devices allowing movement of the trolley in at least one of the first direction and the second direction.

2. The automated storage and retrieval system according to claim 1, wherein the moving devices in the trolley are motorized.

3. The automated storage and retrieval system according to claim 1, wherein the moving devices in the trolley are non-motorized.

4. The automated storage and retrieval system according to claim 1, comprises one or more of the trolleys that are coupled to each other and are not coupled to a drive vehicle, wherein the moving devices in the trolleys are motorized.

5. The automated storage and retrieval system according to claim 1, wherein the moving devices comprise one or more wheels.

6. The automated storage and retrieval system according to claim 1, wherein each of the moving devices comprises a hub motor.

7. The automated storage and retrieval system according to claim 1, wherein the trolley comprises a closed bottom end and an open top end for receiving storage containers from a vehicle comprising a lifting device and moves on or above the rail system.

8. The automated storage and retrieval system according to claim 1, further comprising a plurality of container handling vehicles that are operated on the rail system for retrieving storage containers from and storing storage containers in the storage columns, and for transporting the storage containers horizontally across the rail system, and wherein the rail system comprises at least one transfer zone with underlying transfer columns for temporarily storing storage containers when in transit between the plurality of storage columns and at least one deployment area, wherein the container handling vehicles are arranged to transport the storage containers between the storage columns and the at least one transfer zone.

9. The automated storage and retrieval system according to claim 1, comprises a trolley assembly having a plurality of the trolleys coupled to each other along at least one of the first direction and the second direction.

10. The automated storage and retrieval system according to claim 9, wherein the trolleys are coupled to each other through a disconnectable mechanical connection comprising at least one bracket fixed to adjacent trolleys.

11. The automated storage and retrieval system according to claim 1, further comprises a first drive vehicle coupled to the trolley to form a trolley vehicle, and
the first drive vehicle comprises motorized moving devices allowing self-propelled movement of the first drive vehicle in at least one of the first and second directions, such that the trolley vehicle is horizontally movable.

12. The automated storage and retrieval system according to claim 11, wherein the trolley vehicle further comprises a second drive vehicle with motorized driving devices allowing self-propelled movement of the second drive vehicle in at least one of the first direction and the second direction.

13. The automated storage and retrieval system according to claim 11, wherein
the motorized moving devices of the first drive vehicle are connected to a first end of the trolley, allowing self-propelled, one-way movement along at least one of the first direction and the second direction, and
the motorized moving devices of the second drive vehicle are connected to a second end of the trolley, allowing self-propelled, one-way movement along an opposite direction of a movement direction of the first drive vehicle.

14. The automated storage and retrieval system according to claim 1, wherein the trolley transports the storage containers on dedicated transport rails between the storage columns and at least one deployment area, wherein the deployment area provides direct access to an area outside the grid pattern formed by the first and second sets of tracks.

15. The automated storage and retrieval system according to claim 14, wherein the system further comprises:
a port access vehicle that comprises a plurality of vehicle sections that are connected one after another in a train-like configuration, each vehicle section being configured to carry at least one storage container; and
a plurality of container lifting and holding devices enabling simultaneous transport of a plurality of storage containers between the rail system and the deployment area,
wherein the port access vehicle is arranged to transport the storage containers between the rail system and the at least one deployment area in a plane located above the rail system.

16. The automated storage and retrieval system according to claim 14, wherein the deployment area is a port or port area, wherein the port or port area is arranged within or outside of the grid pattern, either extending along an end row or extending into or out from the grid pattern.

17. The automated storage and retrieval system according to claim 16, wherein the trolley moves in a plane horizontally below the rail system.

18. A trolley for operation on an automated storage and retrieval system, comprising:
a container volume for storing at least one storage container; and
motorized moving devices allowing movement of the trolley in at least one of the first direction and the second direction
wherein the automated storage and retrieval system comprises:
a rail system comprising a first set of parallel tracks arranged in a horizontal plane and extending in a first direction, and a second set of parallel tracks arranged in the horizontal plane and extending in a second direction that is orthogonal to the first direction, wherein the first and second sets of tracks form a grid pattern in the horizontal plane comprising a plurality of adjacent grid cells, each grid cell comprising a grid opening defined by a pair of neighboring tracks of the first set of tracks and a pair of neighboring tracks of the second set of tracks, and
a plurality of stacks of storage containers arranged in storage columns located beneath the rail system, wherein each storage column is located vertically below a grid opening;
wherein the trolley is for moving storage containers; and
wherein the trolley is movable on any rail including: on the rail system or in a horizontal plane above or below the rail system, on a double rail above or below the rail system or combinations thereof.

19. A method of operating an automated storage and retrieval system, the automated storage and retrieval system comprising:
a rail system comprising a first set of parallel tracks arranged in a horizontal plane and extending in a first direction, and a second set of parallel tracks arranged in the horizontal plane and extending in a second direction that is orthogonal to the first direction, wherein the first and second sets of tracks form a grid pattern in the horizontal plane comprising a plurality of adjacent grid cells, each grid cell comprising a grid opening defined by a pair of neighboring tracks of the first set of tracks and a pair of neighboring tracks of the second set of tracks; and a plurality of stacks of storage containers arranged in storage columns located beneath the rail system, wherein each storage column is located vertically below a grid opening;
wherein the method comprises:
utilizing a trolley for transporting the storage containers,
wherein the trolley comprising motorized moving devices allowing movement of the trolley in at least one of the first direction and the second direction, and
the trolley being movable on any rail including: on the rail system or in a plane horizontally above or below the rail system, on a double rail above or below the rail system or combinations thereof.

20. The method according to claim 19, further comprising:
operating a control system to define at least one transfer zone comprising a plurality of transfer columns for temporarily storing storage containers when in transit between the storage columns and at least one deployment area; and
utilizing container handling vehicles that are operated on the rail system for retrieving storage containers from and storing storage containers in the transfer columns, and for transporting the storage containers horizontally across the rail system,
wherein transporting the storage containers between the transfer columns and the at least one deployment area comprises utilizing a port access vehicle cooperating with the trolley, wherein the port access vehicle comprises a plurality of vehicle sections that are connected one after another in a train-like configuration in a horizontal plane that is located above the horizontal plane of the rail system where the container handling vehicles and the trolley operate, wherein each vehicle section is configured to carry at least one storage container, and
wherein the trolley comprises a closed bottom end are adapted to receive storage containers from above, and wherein the method comprises operating the port access vehicle to lower storage containers on to the trolley, and subsequently operating the trolley to transport the storage containers to the deployment area, wherein a second port access vehicle is arranged in the deployment area for lifting the storage containers from the trolley.

* * * * *